US009400585B2

(12) United States Patent
Momchilov et al.

(10) Patent No.: US 9,400,585 B2
(45) Date of Patent: Jul. 26, 2016

(54) DISPLAY MANAGEMENT FOR NATIVE USER EXPERIENCES

(75) Inventors: Georgy Momchilov, Coconut Creek, FL (US); Chakravarthi Valicherla, Coral Springs, FL (US); Mukund Ingale, Pompano Beach, FL (US); Kireeti Valicherla, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 13/253,414

(22) Filed: Oct. 5, 2011

(65) Prior Publication Data
US 2012/0084663 A1 Apr. 5, 2012

Related U.S. Application Data

(60) Provisional application No. 61/389,975, filed on Oct. 5, 2010.

(51) Int. Cl.
*G06F 9/00* (2006.01)
*G06F 3/0481* (2013.01)
(Continued)

(52) U.S. Cl.
CPC ............ *G06F 3/0481* (2013.01); *G06F 3/1423* (2013.01); *G06F 9/4445* (2013.01); *G09G 5/14* (2013.01); *G09G 2340/0464* (2013.01); *G09G 2340/14* (2013.01)

(58) Field of Classification Search
CPC .............................. G06F 3/0481; G06F 3/1423
USPC ..................... 715/744, 762; 725/37
See application file for complete search history.

(56) References Cited

U.S. PATENT DOCUMENTS 8,732,593 B2 * 5/2014 Van Wie et al. ................ 715/757
2002/0069218 A1 * 6/2002 Sull et al. .................... 707/501.1
(Continued)

FOREIGN PATENT DOCUMENTS

CN 101263443 A 9/2008
CN 101482788 A 7/2009

OTHER PUBLICATIONS

"Nebulas Solutions Launches "VDI in a Box" to Cut the Cost, Time and Complexity of Deploying Virtual Desktop Infrastructures", Aug. 4, 2009.
(Continued)

*Primary Examiner* — Stephen Hong
*Assistant Examiner* — Marshon Robinson
(74) *Attorney, Agent, or Firm* — Banner & Witcoff, Ltd.

(57) ABSTRACT

In some remote application execution environments, a client device (e.g., to which application output is sent and where user interaction is performed) may include native control elements for touch input such as virtual keyboards, virtual pickers and the like. When the server device detects an editable/control field of a remoted application receiving focus, the server may instruct the client to activate a native control element for user interaction. The client may determine the manner in which to modify an application display to resolve potential display conflicts. For example, a native control element may obscure or hide portions of the remoted application on the client display. Modifying the application display may include panning the display, zooming into or out of portions of the display, adapting the display for scrolling and the like. The remote computing device may also transmit values for populating a native control element.

30 Claims, 19 Drawing Sheets

(51) Int. Cl.
*G06F 3/14* (2006.01)
*G09G 5/14* (2006.01)
*G06F 9/44* (2006.01)

(56) References Cited

U.S. PATENT DOCUMENTS

| | | | |
|---|---|---|---|
| 2002/0085038 | A1 | 7/2002 | Cobbley et al. |
| 2002/0111995 | A1 | 8/2002 | Mansour et al. |
| 2002/0129096 | A1* | 9/2002 | Mansour et al. ............. 709/203 |
| 2002/0130900 | A1 | 9/2002 | Davis |
| 2005/0005241 | A1 | 1/2005 | Hunleth et al. |
| 2006/0033724 | A1* | 2/2006 | Chaudhri et al. ............. 345/173 |
| 2006/0288015 | A1 | 12/2006 | Schirripa et al. |
| 2007/0024646 | A1 | 2/2007 | Saarinen et al. |
| 2009/0172557 | A1* | 7/2009 | Muta ............................. 715/740 |
| 2009/0183200 | A1 | 7/2009 | Gritton et al. |
| 2010/0023878 | A1* | 1/2010 | Douris et al. ................. 715/757 |
| 2010/0138780 | A1* | 6/2010 | Marano et al. ................ 715/804 |
| 2010/0153866 | A1 | 6/2010 | Sharoni |
| 2010/0257450 | A1* | 10/2010 | Go et al. ....................... 715/733 |
| 2010/0269046 | A1* | 10/2010 | Pahlavan et al. .............. 715/740 |
| 2010/0269152 | A1* | 10/2010 | Pahlavan et al. .................. 726/3 |
| 2010/0299436 | A1* | 11/2010 | Khalid et al. ................. 709/226 |
| 2011/0138295 | A1* | 6/2011 | Momchilov et al. .......... 715/740 |
| 2011/0246904 | A1* | 10/2011 | Pinto et al. .................... 715/740 |
| 2011/0319056 | A1* | 12/2011 | Toy et al. ................... 455/412.2 |
| 2012/0096364 | A1* | 4/2012 | Wilkinson et al. ............ 715/740 |
| 2012/0151369 | A1* | 6/2012 | Kominac et al. .............. 715/740 |
| 2013/0111391 | A1* | 5/2013 | Penner et al. ................. 715/773 |
| 2014/0026063 | A1* | 1/2014 | Duffy ............................ 715/740 |

OTHER PUBLICATIONS

International search report and written opinion for application No. PCT/US11/54922 mailed Mar. 2, 2012.

Sep. 24, 2014—(CN) Notice of First Office Action—App 201180048406.1—English Translation.

Dec. 1, 2009—Nilsson, Erik G., "Design patterns for user interface for mobile application," Advances in Engineering Software, Elsevier Science, vol. 40, No. 12.

* cited by examiner

DISPLAY MANAGEMENT FOR NATIVE USER EXPERIENCES

CROSS-REFERENCE TO RELATED APPLICATION

This application claims the benefit of priority from U.S. Provisional Application No. 61/389,975, entitled "NATIVE USER EXPERIENCE FOR REMOTE APPLICATIONS DISPLAYED ON MOBILE DEVICES," and filed on Oct. 5, 2010. The content of the above noted application is hereby incorporated by reference in its entirety.

TECHNICAL FIELD

Aspects described herein generally relate to displaying remotely executing applications on devices. For example, aspects relate to providing a native application interaction experience on a device.

BACKGROUND

Devices, including stationary devices such as personal computers and workstations and mobile devices such as smart phones and tablet computers, may execute operating systems and applications that are touch-friendly (e.g., compatible with touch input). These operating systems and applications often allow users to interact with menus and applications designed to accommodate using a touch screen as an input device. For example, some applications may be designed to handle a touch screen as the primary input such that when an editable control or field is selected or receives focus, the event may cause a virtual keyboard to appear. FIG. 4A illustrates an example native mobile device application that permits a user to enter information into an editable field via a virtual keyboard displayed on the screen, and permits a user to select from a drop down box (e.g. combo box) using a virtual selector or picker control. In each of these examples, the touch screen of the mobile device may be used as the input device.

In some instances, an application may be displayed on a device that is not formatted for touch-screen input. For example, in some cases an application remotely executing on a server may be remotely displayed on a device as shown in FIG. 4B. In FIG. 4B, a virtual keyboard is displayed over the editable control or field such that the user might not be able to see the control while the user is trying to input data into the control, thus making user input difficult. Additionally, the user may be required to manually activate the native control element of the client device, instead of being provided a native control element that is automatically triggered in response to selection of an editable area. Other input and viewability issues might also arise from touch compatible input elements being displayed on a remote device.

BRIEF SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

According to one or more aspects, a display of a remoted application and native control elements may be managed so that one or more portions of the remoted application display are not obscured or hidden by active native control elements.

In one example, a remote computing device executing the application for a client device may receive a notification when the application or a control element within the application receives focus. Upon receiving the notification, the remote computing device may notify the client device to modify the display of the application as necessary (e.g., to reflect the focus) and/or to determine a type of control element corresponding to the control element within the remoted application receiving focus. Additionally or alternatively, the remote computing device may instruct the client device to activate a native control element corresponding to the determined type of control element. The client device may then identify a native control element matching the determined type or category of control element and active the native control element. In some arrangements, the client device may further determine whether the native control element will overlap or otherwise obscure one or more portions of the remoted application display when activated. If so, the client device may modify the local display to avoid obscuring the remoted application display or the area of focus. Modification of the application display may include panning, zooming, scrolling and the like.

According to another aspect, the client device may transmit confirmation and update messages to the remote computing device. The confirmation and update messages may include status information for the native control element and notifications of user interaction with the native control element.

In some arrangements, the remote computing device executing the application may determine whether the native control element will obscure the application display and determine a manner in which to modify the local display of the client device.

According to another aspect, a remote computing device executing the application may transmit values of an application control element receiving focus to the client device for populating the native control element. In one example, if the application control element receiving focus is a drop down menu, the values within the drop down menu may be transmitted to the client device for display in a native picker control element of the client device.

According to yet another aspect, if a client device does not have native control elements, the remote computing device may generate a virtual control element and remote the control element to the client device similar to remoting an application to which input or interaction is to be registered. For example, if the client device is not capable of showing a local software keyboard, then an in-session keyboard (e.g., remoted by the server) may be displayed instead. The display of the in-session keyboard may be remoted (e.g., graphics transmitted) to the client device for use thereon.

The details of these and other embodiments of the present disclosure are set forth in the accompanying drawings and the description below. Other features and advantages of the disclosure will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Applications may be executed remotely by a first computing device for use at a second computing device (e.g., a client device). By using a remoted application, the client device may use processing power by the first computing device to execute the functionality and features of the remoted application. Additionally, data and applications may be served at a location that is accessible from multiple remote locations (e.g., through a public and/or private network).

Figure 1A:
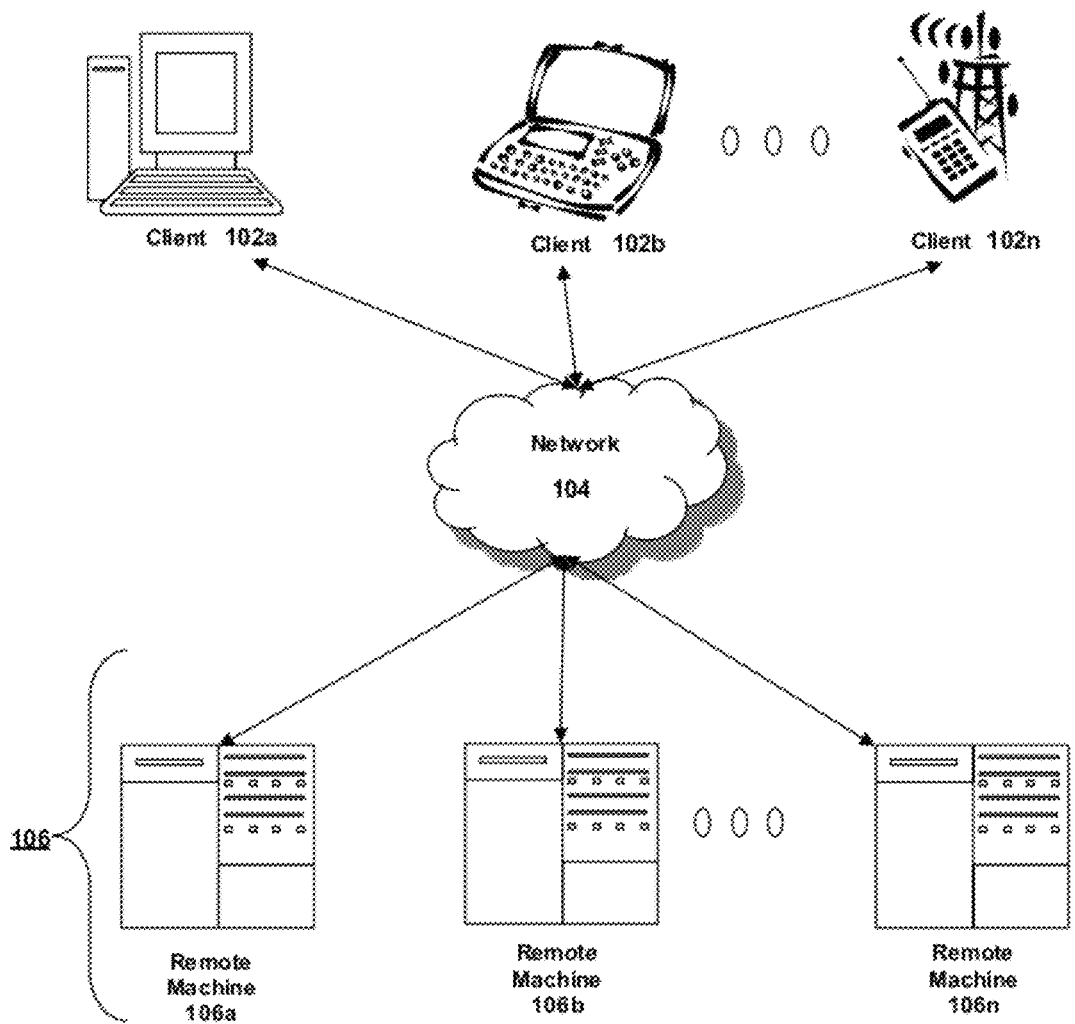
FIG. 1A illustrates an example network environment that may be configured to provide remote access to computing devices and application programs executing thereon according to one or more aspects described herein.

FIG. 1A illustrates an example computing environment 101 that includes one or more client machines 102A-102N (collectively referred to herein as "client machine(s) 102") that are in communication with one or more servers 106A-106N (generally referred to herein as "server(s) 106"). Installed in between the client machine(s) 102 and server(s) 106 is a network.

In one example, the computing environment 101 can include an appliance (e.g., a device or apparatus) installed between the server(s) 106 and client machine(s) 102. This appliance can manage client/server connections, and in some cases can load balance client connections amongst a plurality of backend servers.

The client machine(s) 102 may, in some examples, be a single client machine 102 or a single group of client machines 102, while server(s) 106 may be a single server 106 or a single group of servers 106. In one example, a single client machine 102 may communicate with more than one server 106, while in another example, a single server 106 may communicate with more than one client machine 102. In yet another example, a single client machine 102 might only communicate with a single server 106.

A client machine 102 may, in some examples, be referenced by any one of the following terms: client machine(s) 102; client(s); client computer(s); client device(s); client computing device(s); local machine; remote machine; client node(s); endpoint(s); endpoint node(s); or a second machine. The server 106, in some examples, may be referenced by any one of the following terms: server(s), local machine; remote machine; server farm(s), host computing device(s), or a first machine(s).

According to one or more arrangements, the client machine 102 may be a virtual machine 102C. The virtual machine 102C may be any virtual machine, while in some configurations, the virtual machine 102C may be any virtual machine managed by a hypervisor developed by XenSolutions, Citrix Systems, IBM, VMware, or any other hypervisor. In other examples, the virtual machine 102C can be managed by any hypervisor, while in still other examples, the virtual machine 102C can be managed by a hypervisor executing on a server 106 or a hypervisor executing on a client 102.

The client machine 102 may, in some examples, execute, operate or otherwise provide an application such as: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Accordingly, in at least some arrangements, remoting an application may include a client device 102 receiving and displaying application output generated by an application remotely executing on a server 106 or other remotely located machine or computing device. For example, the client device 102 may display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted). Applications may be remoted in multiple ways. In one example, applications may be remoted in a seamless manner in which windows are created on the client device so as to make the application display seem as if it were running locally on the client device and the desktop thereof. In another example, a remoted application may be provided in a windowed mode where a desktop is remoted to the client device and the application is displayed as an application executing in the remoted desktop. Various other remoting methods and techniques may also be implemented or used.

According to some aspects, the server 106 may execute a remote presentation client or other client or program that uses a thin-client or remote-display protocol to capture display output generated by an application executing on a server 106 and to subsequently transmit the application display output to a remote client 102. The thin-client or remote-display protocol can be any one of the following protocols (or other suitable protocol): the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically and/or physically grouped together into a server farm 106. In one example, the server farm 106 can include servers 106 that are geographically dispersed and logically grouped together in a server farm 106, or, in another example, servers 106 that are located proximate to each other and logically grouped together in a server farm 106. Geographically dispersed servers 106A-106N within a server farm 106 can, in some examples, communicate using a WAN, MAN, or LAN, where different geographic regions can be characterized as: different continents; different regions of a continent; different countries; different states; different cities; different zip codes; different neighborhoods; different campuses; different rooms; or any combination of the preceding geographical locations. In some examples, the server farm 106 may be administered as a single entity, while in other examples, the server farm 106 can include multiple server farms 106.

A server farm 106 may include servers 106 that execute a substantially similar type of operating system platform (e.g., WINDOWS NT, manufactured by Microsoft Corp. of Redmond, Wash., UNIX, LINUX, or SNOW LEOPARD.) In other examples, the server farm 106 can include a first group of servers 106 that execute a first type of operating system platform, and a second group of servers 106 that execute a second type of operating system platform. The server farm 106, in other examples, can include servers 106 that execute different types of operating system platforms.

The server 106, in some examples, may be of any server type. In other examples, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some examples, a server 106 may be a RADIUS server that includes a remote authentication dial-in user service. In arrangements where the server 106 includes an appliance, the server 106 may be an appliance manufactured by any one of the following manufacturers: the Citrix Application Networking Group; Silver Peak Systems, Inc; Riverbed Technology, Inc.; F5 Networks, Inc.; or Juniper Networks, Inc. Some examples include a first server 106A that receives requests from a client machine 102, forwards the request to a second server 106B, and responds to the request generated by the client machine 102 with a response from the second server 106B. The first server 106A may acquire an enumeration of applications available to the client machine 102 as well as address information associated with an application server 106 hosting an application identified within the enumeration of applications. The first server 106A may then present a response to the client's request using a web interface, and communicate directly with the client 102 to provide the client 102 with access to an identified application.

The server 106 may, in some examples, execute any one of the following applications: a thin-client application using a thin-client protocol to transmit application display data to a client; a remote display presentation application; any portion of the CITRIX ACCESS SUITE by Citrix Systems, Inc. like the METAFRAME, CITRIX PRESENTATION SERVER, CITRIX XENAPP or CITRIX XENDESKTOP server; MICROSOFT WINDOWS Terminal Services manufactured by the Microsoft Corporation; or an ICA client, developed by Citrix Systems, Inc. Another example includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other examples include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 may, in some examples, be a client node that seeks access to resources provided by a server 106. In other examples, the server 106 may provide clients 102 or client nodes with access to hosted resources. The server 106, in some examples, functions as a master node such that it communicates with one or more clients 102 or servers 106. In some examples, the master node may identify and provide address information associated with a server 106 hosting a requested application, to one or more clients 102 or servers 106. In still other examples, the master node may be a server farm 106, a client 102, a cluster of client nodes 102, or an appliance.

One or more clients 102 and/or one or more servers 106 may transmit data over a network 104 installed between machines and appliances within the computing environment 101. The network 104 may comprise one or more sub-networks, and may be installed between any combination of the clients 102, servers 106, computing machines and appliances included within the computing environment 101. In some examples, the network 104 may be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further examples include a network 104 that may be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link may be an infrared channel or satellite band. The network topology of the network 104 may differ within different examples, possible network topologies include: a bus network topology; a star network topology; a ring network topology; a repeater-based network topology; or a tiered-star network topology. Additional examples may include a network 104 of mobile telephone networks that use a protocol to communicate among mobile devices, where the protocol may be any one of the following: AMPS; TDMA; CDMA; GSM; GPRS UMTS; or any other protocol able to transmit data among mobile devices.

Figure 1B:
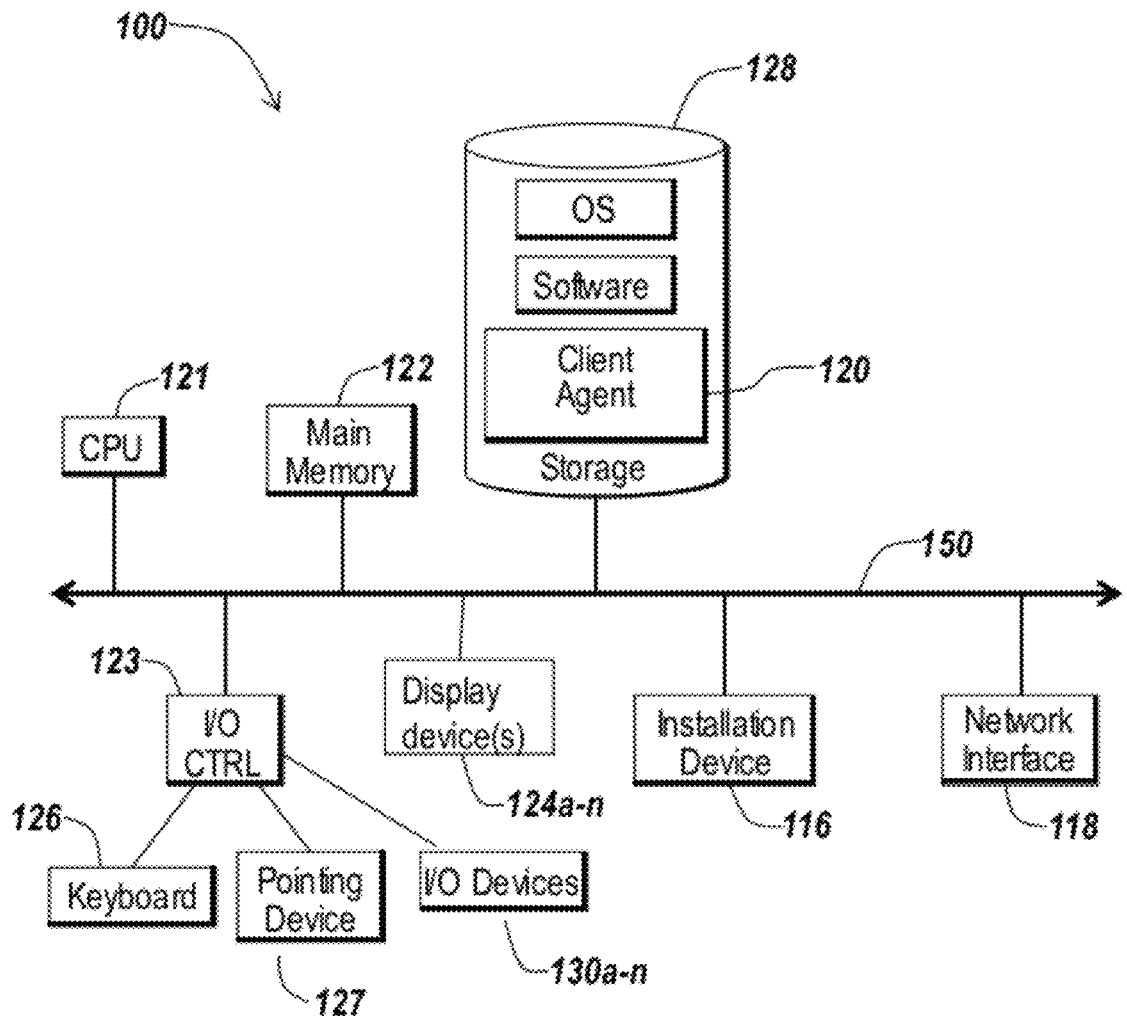
FIG. 1B and FIG. 1C are block diagrams illustrating example computing devices according to one or more aspects described herein.

FIG. 1B illustrates an example computing device 100. The client machine 102 and server 106 illustrated in FIG. 1A may be deployed as and/or executed on any example of computing device 100 illustrated and described herein or any other computing device. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one example, the storage memory 128 includes: an operating system, software routines, and a client agent 120. The I/O controller 123, in some examples, is further connected to a key board 126, and a pointing device 127. Other examples may include an I/O controller 123 connected to one or more of input/output devices 130A-130N.

Figure 1C:
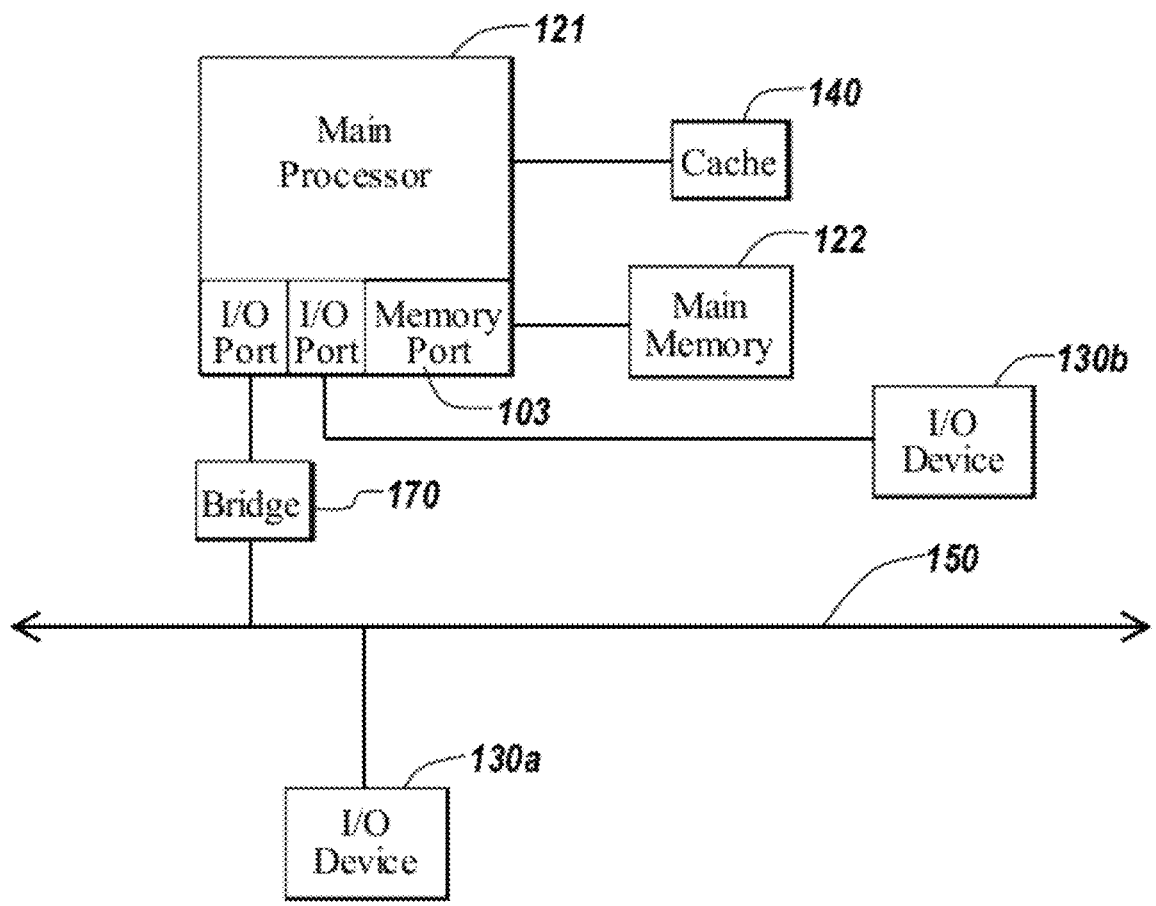

FIG. 1C illustrates an example computing device 100, where the client machine 102 and server 106 illustrated in FIG. 1A may be deployed as and/or executed on any example of the computing device 100 illustrated and described herein or any other computing device. Included within the computing device 100 is a system bus 150 that communicates with the following components: a bridge 170, and a first I/O device 130A. In another example, the bridge 170 is in further communication with the main central processing unit 121, where the central processing unit 121 may further communicate with a second I/O device 130B, a main memory 122, and a cache memory 140. Included within the central processing unit 121, are I/O ports, a memory port 103, and a main processor.

Examples of the computing machine 100 may include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other examples of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some examples the computing device 100 may include one or more processing units 121. In these examples, the computing device 100 may store and execute firmware or other executable instructions that, when executed, direct the one or more processing units 121 to simultaneously execute instructions or to simultaneously execute instructions on a single piece of data. In other examples, the computing device 100 may store and execute firmware or other executable instructions that, when executed, direct the one or more processing units to each execute a section of a group of instructions. For example, each processing unit 121 may be instructed to execute a portion of a program or a particular module within a program.

In some examples, the processing unit 121 may include one or more processing cores. For example, the processing unit 121 may have two cores, four cores, eight cores, etc. In one example, the processing unit 121 may comprise one or more parallel processing cores. The processing cores of the processing unit 121, may in some examples access available memory as a global address space, or in other examples, memory within the computing device 100 may be segmented and assigned to a particular core within the processing unit 121. In one example, the one or more processing cores or processors in the computing device 100 may each access local memory. In still another example, memory within the computing device 100 may be shared amongst one or more processors or processing cores, while other memory may be accessed by particular processors or subsets of processors. In examples where the computing device 100 includes more than one processing unit, the multiple processing units may be included in a single integrated circuit (IC). These multiple processors, in some examples, may be linked together by an internal high speed bus, which may be referred to as an element interconnect bus.

In examples where the computing device 100 includes one or more processing units 121, or a processing unit 121 including one or more processing cores, the processors may execute a single instruction simultaneously on multiple pieces of data (SIMD), or in other examples may execute multiple instructions simultaneously on multiple pieces of data (MIMD). In some examples, the computing device 100 may include any number of SIMD and MIMD processors.

The computing device 100, in some examples, may include a graphics processor or a graphics processing unit (Not Shown). The graphics processing unit may include any combination of software and hardware, and may further input graphics data and graphics instructions, render a graphic from the inputted data and instructions, and output the rendered graphic. In some examples, the graphics processing unit may be included within the processing unit 121. In other examples, the computing device 100 may include one or more processing units 121, where at least one processing unit 121 is dedicated to processing and rendering graphics.

In one example, computing machine 100 may include a central processing unit 121 that communicates with cache memory 140 via a secondary bus also known as a backside bus, while another example of the computing machine 100 includes a central processing unit 121 that communicates with cache memory via the system bus 150. The local system bus 150 may, in some examples, also be used by the central processing unit to communicate with more than one type of I/O device 130A-130N. In some examples, the local system bus 150 may be any one of the following types of buses: a VESA VL bus; an ISA bus; an EISA bus; a MicroChannel Architecture (MCA) bus; a PCI bus; a PCI-X bus; a PCI-Express bus; or a NuBus. Alternatively or additionally, computing machine 100 may include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further examples of the computing machine 100 include a processor 121 that communicates with one I/O device 130A using a local interconnect bus and a second I/O device 130B using a direct connection.

The computing device 100, in some examples, includes a main memory unit 122 and cache memory 140. The cache memory 140 may be any memory type, and in some examples may be any one of the following types of memory: SRAM; BSRAM; or EDRAM. Other examples include cache memory 140 and a main memory unit 122 that may be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further examples include a central processing unit 121 that may access the main memory 122 via: a system bus 150; a memory port 103; or any other connection, bus or port that allows the processor 121 to access memory 122.

In one or more arrangements, computing device 100 may provide support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications may, in some examples, include a client agent 120, or any portion of a client agent 120. The computing device 100 may further include a storage device 128 that may be either one or more hard disk drives, or one or more redundant arrays of independent disks; where the storage device is configured to store an operating system, software, programs applications, or at least a portion of the client agent 120. Computing device 100 may also include an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections may also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 may comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

According to one or more aspects, computing device 100 may include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some examples connect to multiple I/O devices 103A-130N to control the one or more I/O devices. In some examples, I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Additionally or alternatively, computing device 100 may include I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some examples, the computing machine 100 may connect to multiple display devices 124A-124N, in other examples the computing device 100 may connect to a single display device 124, while in still other examples the computing device 100 connects to display devices 124A-124N that are the same type or form of display, or to display devices that are different types or forms. Examples of the display devices 124A-124N may be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some examples be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other examples of the computing device 100 may include multiple display devices 124A-124N provided by multiple secondary computing devices and connected to the main computing device 100 via a network.

According to one or more arrangements, the computing machine 100 may execute any operating system including: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In some examples, the computing machine 100 may execute multiple operating systems. For example, the computing machine 100 may execute PARALLELS or another virtualization platform that may execute or manage a virtual machine executing a first operating system, while the computing machine 100 executes a second operating system different from the first operating system.

The computing machine 100 may be embodied in any one of the following computing devices: a computing workstation; a desktop computer; a laptop or notebook computer; a server; a handheld computer (e.g., a tablet computer such as the iPad and iPad 2 manufactured by Apple Computer); a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other examples the computing machine 100 may be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other examples, the computing device 100 may be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some examples, the computing device 100 may have different processors, operating systems, and input devices consistent with the device. For example, in one example, the computing device 100 is a TREO 180, 270, 600, 650, 680, 700p, 700w, or 750 smart phone manufactured by Palm, Inc. In some of these examples, the TREO smart phone is operated under the control of the PalmOS operating system and includes a stylus input device as well as a five-way navigator device.

According to one or more configurations, the computing device 100 may be a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some examples, the computing device 100 is a mobile device manufactured by Nokia of Finland, or by Sony Ericsson Mobile Communications AB of Lund, Sweden.

In some examples, the computing device 100 may be a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other examples, the computing device 100 is a smart phone, Pocket PC, Pocket PC Phone, or other handheld mobile device supporting Microsoft Windows Mobile Software. Moreover, the computing device 100 may be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Additionally or alternatively, the computing device 100 may be a digital audio player. For example, the computing device 100 is a digital audio player such as the Apple IPOD, IPOD Touch, IPOD NANO, and IPOD SHUFFLE lines of devices, manufactured by Apple Computer of Cupertino, Calif. In another of these examples, the digital audio player may function as both a portable media player and as a mass storage device. In other examples, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other examples, the computing device 100 is a portable media player, such as the Zen Vision W, the Zen Vision series, the Zen Portable Media Center devices, or the Digital MP3 line of MP3 players, manufactured by Creative Technologies Ltd. In yet other examples, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

The computing device 100 may, alternatively or additionally, include a combination of devices, such as a mobile phone combined with a digital audio player or portable media player. In one of these examples, the computing device 100 is a Motorola RAZR or Motorola ROKR line of combination digital audio players and mobile phones. In another of these examples, the computing device 100 is an iPhone smartphone, manufactured by Apple Computer of Cupertino, Calif.

Application Display Management

Figure 2A:
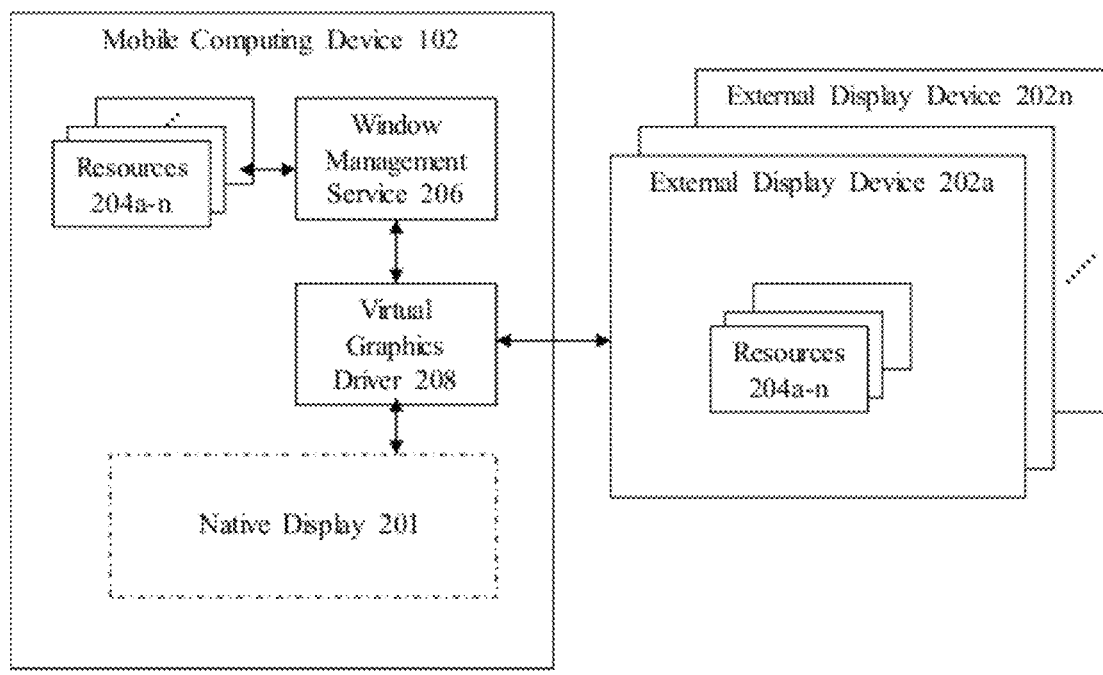
FIG. 2A is a block diagram illustrating an example system for displaying a plurality of resources in a user-configurable display layout on an external display device according to one or more aspects described herein.

Referring now to FIG. 2A, the block diagram illustrates an example system for displaying a plurality of resources on one or more display devices. The system includes a mobile computing device 102 that may communicate with one or more external display devices 202a-n. The example in FIG. 2A shows a mobile computing device 102 with a native display 201, although devices without native displays may also be used. The mobile computing device 102 executes a plurality of resources 204a-n (collectively, 204). The window management system 206 and virtual graphics driver 208 manage the locations and sizes of the display of output data associated with each of the plurality of resources in a user-configurable display layout. In many examples, the mobile computing device 102 transmits the output data associated with each of the plurality of resources 204 to an external display device 202. In some of these examples, the mobile computing device 102 transmits the output data upon establishing a connection with the external display device 202. Alternatively or additionally, the mobile computing device 102 transmits the output data associated with each of the plurality of resources 204 to the device's native display 201. For example, the mobile computing device 102 might only transmit the output data to the device's native display or only transmit the output data to one or more of the external display devices 202a-n. In some examples, the mobile computing device 102 transmits the output data associated with certain of the plurality of resources 204 to the native display 201 and transmits the output data associated with other ones of the plurality of resources 204 to the external display devices 202a-n.

Mobile computing device 102 may be configured to execute a plurality of resources 204. In one example, the mobile computing device 102 is a client 102 as described above in connection with FIGS. 1A-1C. In another example, the mobile computing device 102 displays the output data associated with a resource 204a in a plurality of resources 204a-n executed by the mobile computing device 102. In some examples, the mobile computing device 102 displays the output data associated with each of the plurality of resources 204.

A resource in the plurality of resources 204 may include, without limitation, a data file, an executable file, configuration files, an application, a desktop environment (which may itself include a plurality of applications for execution by the user), a computing environment image (such as a virtual machine image), and/or operating system software or other applications needed to execute a computing environment image.

According to one or more arrangements, mobile computing device 102 includes a window management service 206 allowing an external display device 202 to display the output data associated with each of a plurality of resources 204 executed on the mobile computing device 102. The window management service 206 may also allow multiple resources running on the mobile computing device 102 to be viewed on an external display device 202 or the native display 201 at substantially the same time, as opposed to allowing the output of one resource 204 to be viewed exclusively on the native display 201 or external display device 202. In one example, the window management service 206, in conjunction with a virtual graphics driver 208, manages the display layout of the windows displayed on the external display device 202 and the native display 201. In some examples, the virtual graphics driver 208 is a driver-level component that manages a virtual screen frame buffer storing output data that will be displayed by the native display 201 on the mobile computing device 102 or an external display device 202. The window management service 206, in conjunction with the virtual graphics driver 208, may further manage the boundaries and size of a screen space used to display output data and on which display device the output data is displayed.

In some examples, an external display device 202 receives output data associated with each of the plurality of resources 204 and displays the output data in a user-configurable display layout. In one example, the external display device 202 includes a dock to which the mobile computing device 102 connects. In another example, the external display device 202 includes a receiver for communicating with the mobile computing device 102 wirelessly, for example, via BLUETOOTH, Wi-Fi or other networking protocols, as described above in connection with FIGS. 1A-1C. In still another example, the external display device 202 may be a display device 124 as described above in connection with FIGS. 1B and 1C.

Figure 2B:
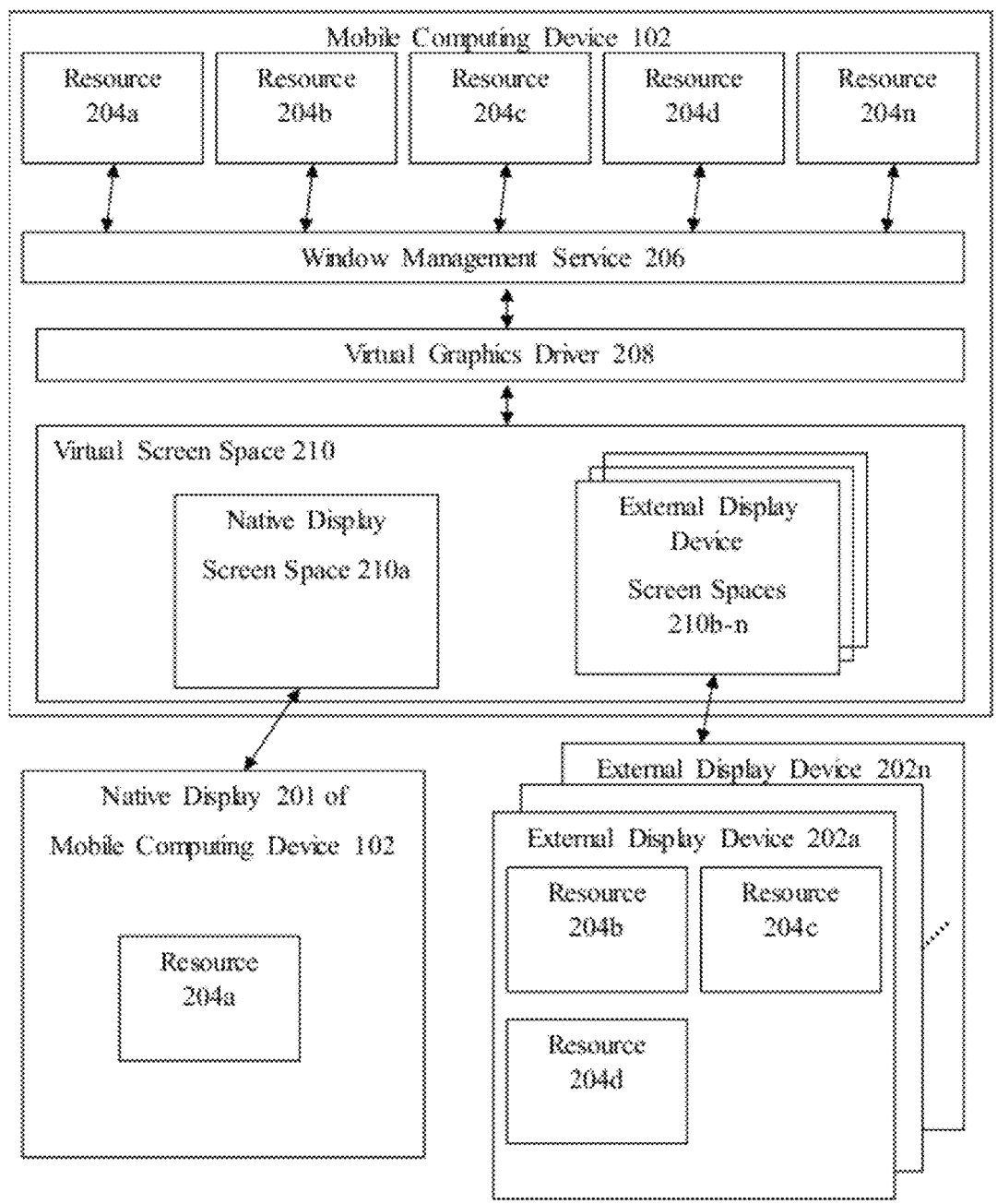
FIG. 2B is a block diagram illustrating an example system for mapping a display of one or more resources to one or more display devices according to one or more aspects described herein.

Referring now to FIG. 2B, the block diagram illustrates an example system for mapping the display of one or more resources 204 of the mobile computing device 102 on one or more display devices 201 and/or 202. In various examples, the window management service 206 manages a virtual screen space 210. The virtual screen space 210 may map to the native display 201 and one or more external display devices 202. The window management service 206 may position output data associated with the user interfaces of one or more resources 204 on the virtual screen space 210 to specify where each user interface will be displayed. In some examples, the window management service 206 positions the output data according to a user preference. In additional examples, the window management service 206 positions the output data according to a policy. In various examples, the window management service 206 positions the output data based on the resource 204 associated with the output data.

The window management service 206 communicates with the virtual graphics driver 208 to transmit output data associated with user interfaces of resources 204 to the native display 201 and one or more external display devices 202. In some examples, the window management service 206 may transmit output data and associated coordinates from the virtual screen space 210 to the virtual graphics driver 208. In various examples, the virtual graphics driver 208 stores the output data in a virtual screen frame buffer. In many examples, the virtual graphics driver 208 transmits the entries in the virtual screen frame buffer to the native display 201 and external display devices 202. In many examples, the virtual graphics driver 208 transmits an entry in the virtual screen frame buffer to a native display 201 or an external display device 202 based on the position of the entry in the frame buffer.

Figure 2C:
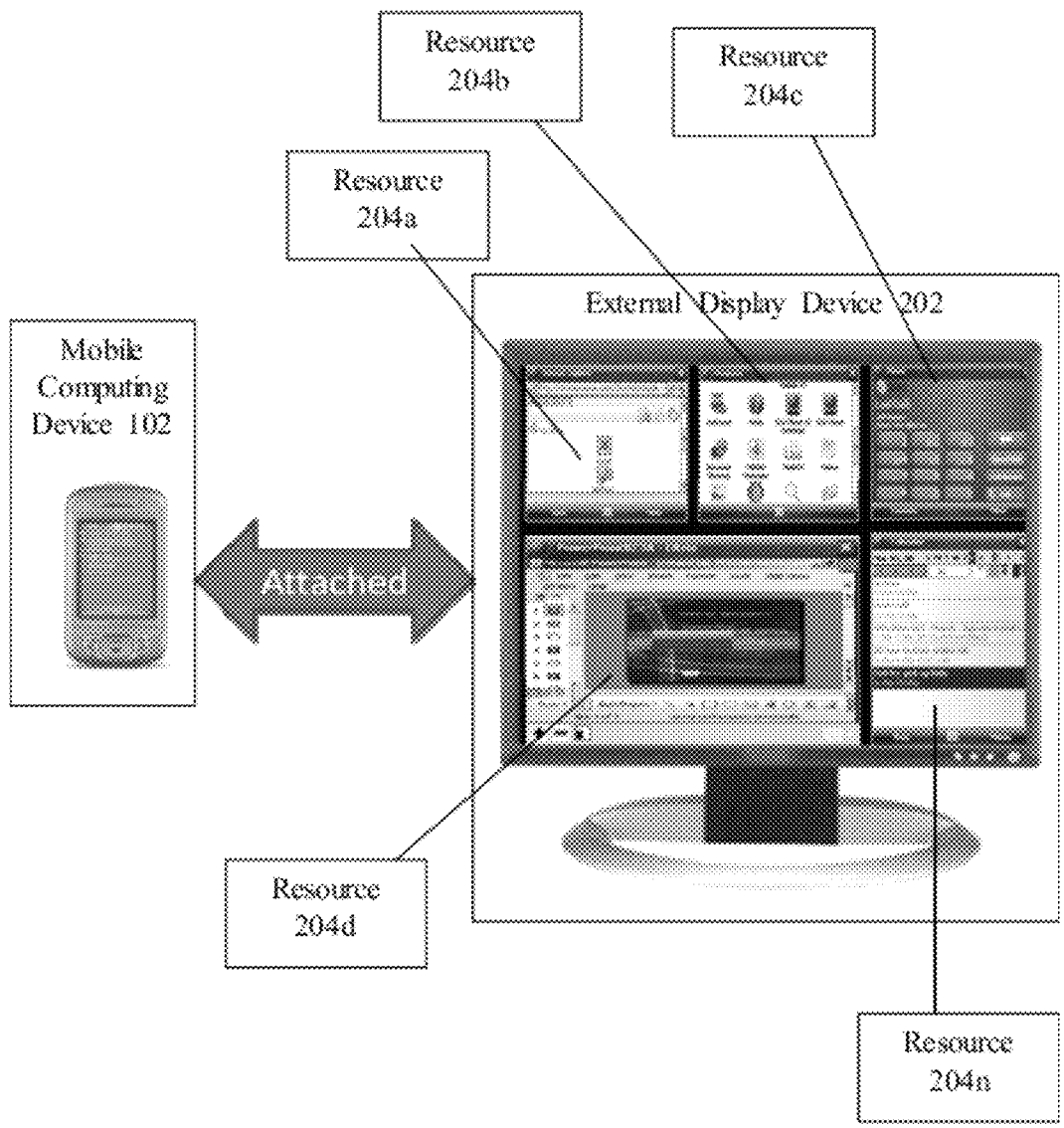
FIG. 2C illustrates an example interface displaying a plurality of resources in a user-configurable display layout on an external display device, the user-configurable display layout divided into a grid according to one or more aspects described herein.

Referring now to FIG. 2C, the user interface illustrates an example user-configurable display layout in which the external display device 202 displays the output data of the resources 204. In this example, the output data of the resources 204 is displayed in a grid display layout. The grid display layout may include one or more cells in an arrangement. A cell may display output data associated with a resource. In some examples, more than one cell displays output data associated with the same resource.

Additionally, in some examples, the cells are uniformly sized, whereas in other examples, the cells have different sizes. The cells may be arranged in any configuration. In some examples, the cells may be arranged in rows, columns, or both. A cell may have a descriptor associated with the cell's position in the grid. The descriptor may indicate the position of a cell within a row. In the example depicted in FIG. 2C, the cell for resource 204a may have the descriptor "1-1," the cell for resource 204b may have the descriptor "1-2," the cell for resource 204c may have the descriptor "1-3," the cell for resource 204d may have the descriptor "2-1," and the cell for resource 204d may have the descriptor "2-2." In other examples, the cells may be numbered, e.g. "Cell 1," "Cell 2," etc. However, any system of choosing descriptors known to those of ordinary skill in the art may be used.

In various examples, the window management service 206 configures a grid display layout according to the resources 204 being displayed on the native display 201 or the external display device 202. In some examples, the service 206 configures a grid display layout according to the number of resources 204 being displayed. In other examples, the service 206 configures a grid display layout according to the size or amount of content in the user interfaces of the resources 204. For example, if an external display device 202 will display four resources with comparable amounts of content, the window management service 206 may configure a grid display layout with four uniform cells. In another example, if an external display device 202 will display four resources and one resource includes three times as much content as the others, the window management service 206 may configure a grid display layout with three uniform cells in a first row and a single cell in a second row. The single cell in the second row may be three times as wide as the cells in the first row. In various examples, the window management service 206 may configure a grid display layout to reserve a cell for displaying information about the resources being displayed, such as a menu of the resources. In many examples, the window management service 206 may configure a grid display layout to reserve a cell for allowing a user to configure the grid display layout.

Figure 2D:
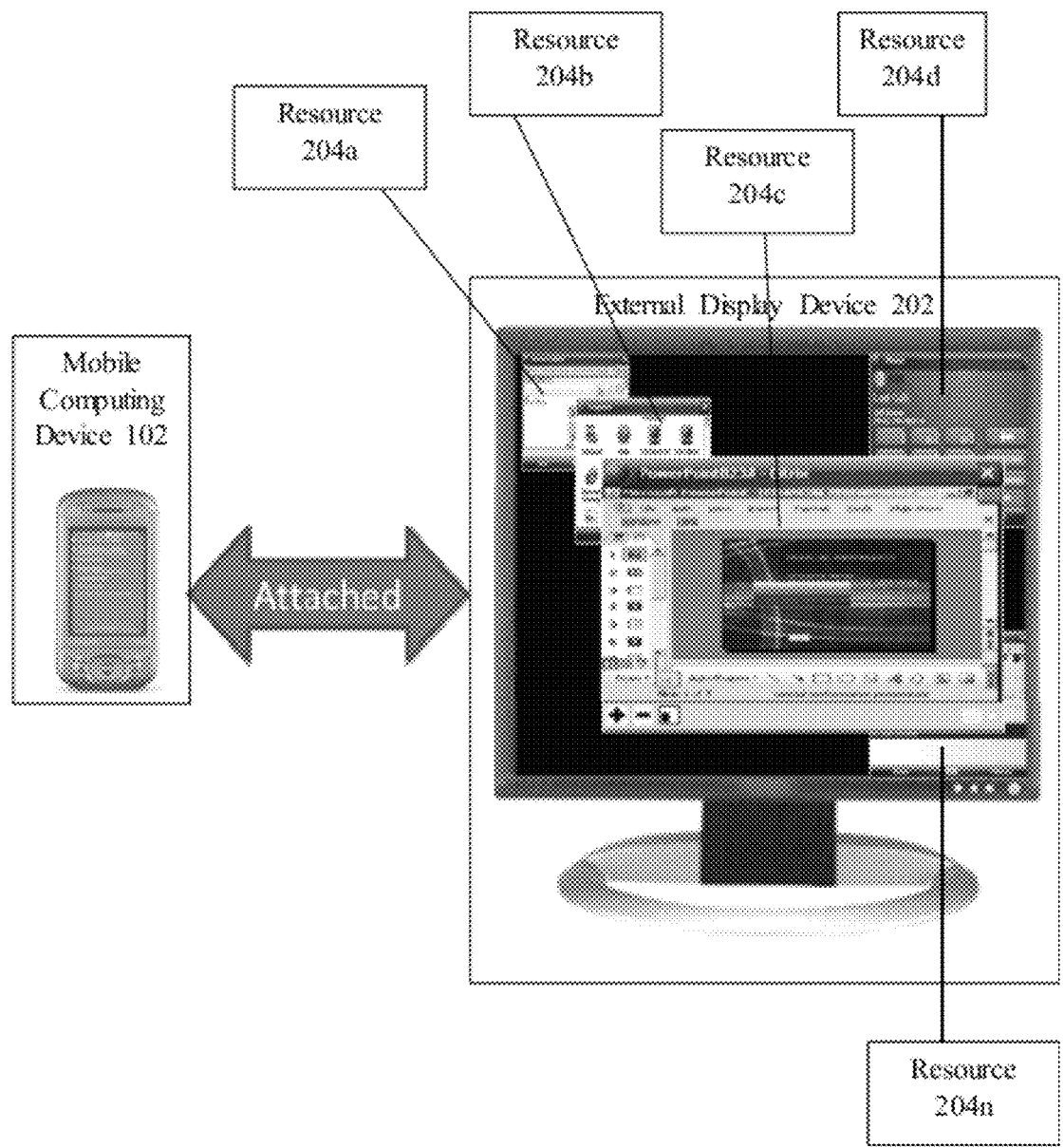
FIG. 2D illustrates an example interface displaying a plurality of resources in a user-configurable, dynamic display layout on an external display device according to one or more aspects described herein.

Referring now to FIG. 2D, a user interface illustrates an example user-configurable display layout providing a dynamic display layout in which the external display device 202 displays the output data associated with the plurality of resources 204. In this example, windows on the external display device 202 that display output data for resources 204 may be dynamically positioned and sized. The window management service 206 may position a user interface for a resource at a default position and with a default size chosen according to a policy, the resource 204, or any other method. The window management service 206 may order overlapping user interfaces such that higher-order user interfaces obscure lower-order user interfaces. The window management service 206 may transmit output data to the virtual graphics driver 208 reflecting the obfuscation. The user may re-position or re-size a window by, for example, clicking and dragging the window or a window edge. In these examples, the virtual graphics driver 208 may detect the user's change to the window, and transmit information about the user's change to the window management service 206. The window management service 206 may process the change and transmit updated output data to the virtual graphics driver 208. In some examples, the user moves the user interface for a resource 204 to any location on a native display 201 or external display device 202. In some examples, the user moves the user interface for a resource 204 to a different display device. In some examples, the updated output data indicates that one user interface's size has been increased or location has been adjusted to obscure another user interface. In other examples, the updated output data indicates that one user interface's size has been decreased or location has been adjusted such that more of another user interface shall be visible.

Figure 3A:
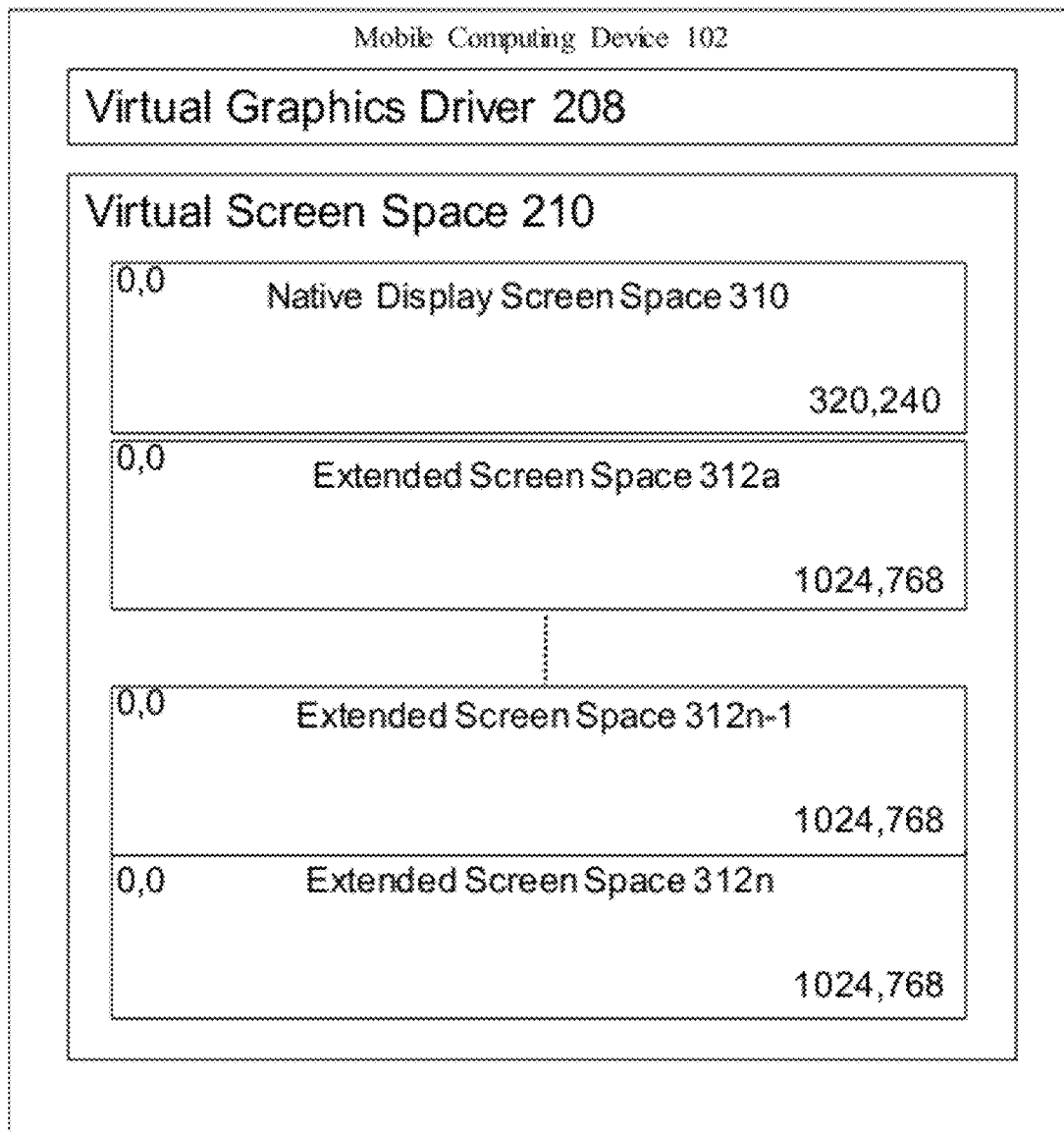
FIG. 3A is a block diagram illustrating example screen spaces provided by a mobile computing device attached to one or more external display devices according to one or more aspects described herein.

Referring now to FIG. 3A, a block diagram illustrates example virtual screen spaces 210 provided by a mobile computing device attached to one or more external display devices. As shown in FIG. 3A, the mobile computing device 102 includes a virtual graphics driver 208 and a virtual screen 210. The virtual screen 210 includes a plurality of virtual screen spaces 310 and 312*a-n*. Virtual screen space 310 may be a native display screen space for the native display 201 on the mobile computing device 102. The other virtual screen spaces 312*a-n* may be extended screen spaces that correspond to the displays of external display devices 202. The window management service 206 and virtual graphics driver 208 manage the virtual screen 210. In one example, the virtual graphics driver 208 uses a virtual screen frame buffer to manage the mobile computing device's native display 201 and change the native display's 201 screen resolution. In another example, the virtual graphics driver 208 uses a virtual screen frame buffer to manage an extended screen space 312 and to change a resolution of the extended screen 312.

In some examples, the virtual graphics driver 208 allocates and manages a plurality of virtual screen spaces 310, 312*a-n* and virtual screen frame buffers. In some of these examples, each virtual screen space and virtual screen frame buffer has a resolution independent of the other screen spaces and frame buffers. In one of these examples, output data associated with each of the plurality of resources 204 may reside within any of the virtual screen spaces 310, 312*a-n*. In another of these examples, each of the extended screen spaces 312*a-n* is associated with at least one external display device 202, depending on the capabilities of the device.

In various examples, the window management service 206 and the virtual graphics driver 208 allocate and manage the display, on a plurality of external display devices 202, of output data associated with a plurality of resources. For example, output data associated with a resource 204*a* displays on a mobile computing device 102, output data associated with a resource 204*b* displays on one external display device 202*a*, and output data associated with a resource 204*c* display on another external display device 202*b*. In another of these examples, the window management device 206 identifies one of the external display devices 202 for displaying output data generated by a resource 204*a* based upon a type of the resource 204*a*. For example, the window management service 206 may determine that a type of resource rendering a video may display on a television screen, while a type of resource rendering a word processing application may render on a display of a laptop computer.

Figure 3B:
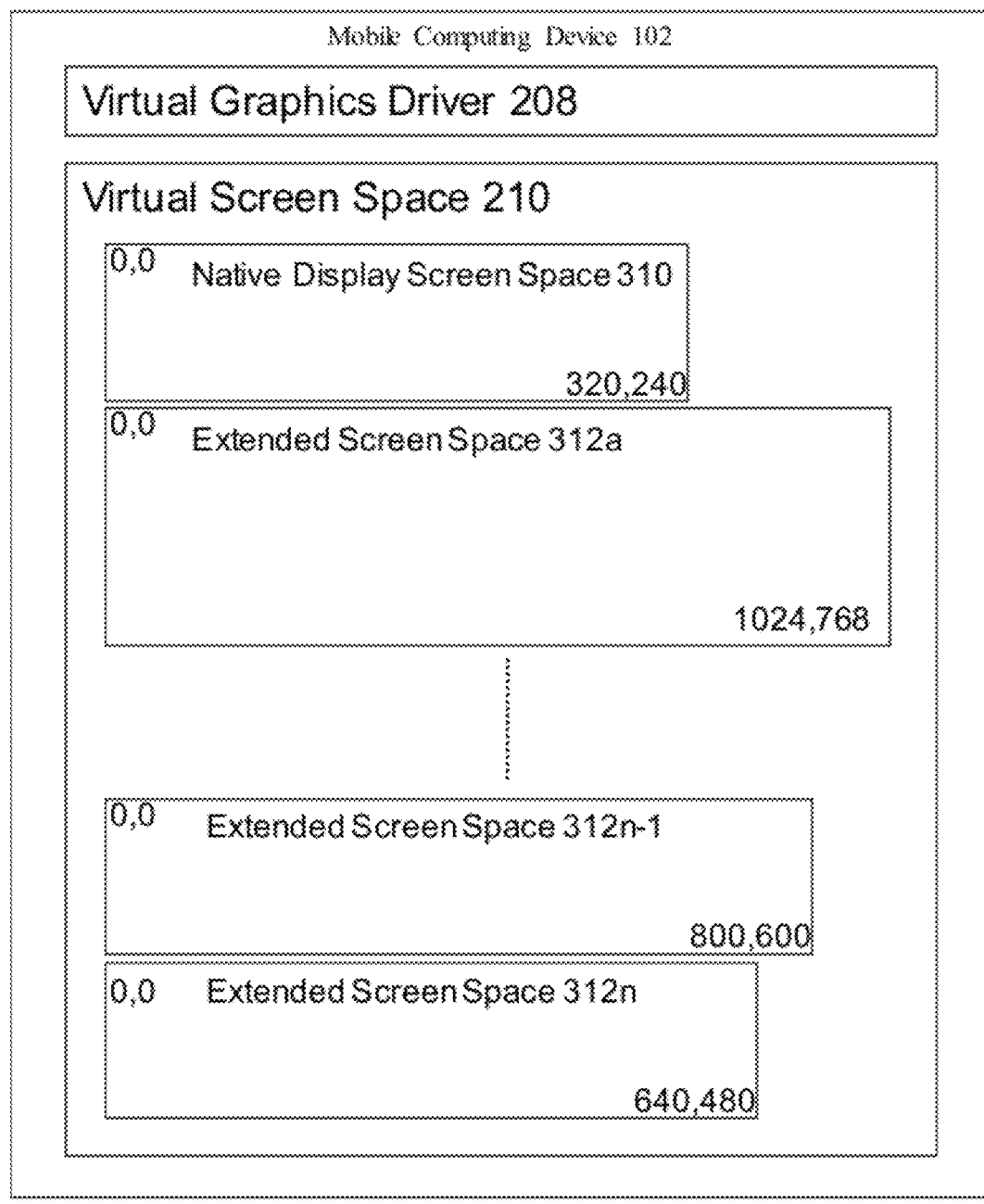
FIG. 3B is a block diagram illustrating an example mobile computing device providing a plurality of screen spaces according to one or more aspects described herein.

Referring now to FIG. 3B, a block diagram illustrates an example mobile computing device 102 providing a virtual screen 210 with virtual screen spaces 310, 312*a-n* of varying resolutions. In this example, the virtual screen 210 includes a native display screen space 310 corresponding to the native display 201 of the mobile computing device 102 with a resolution of 320 pixels×240 pixels. The virtual screen 210 also includes an extended screen 312*a* corresponding to the display of an external display device 202 with a resolution of 1024 pixels×768 pixels, an extended screen 312*n*-1 corresponding to the display of an external display device 202 with a resolution of 800 pixels×600 pixels, and an extended screen 312*n* corresponding to the display of an external display device 202 with a resolution of 640 pixels×480 pixels. In many examples, the virtual screen 210 may include a native display screen space 310 and any number of extended screens 312 of any resolution. The entire virtual screen space 210 may be mapped into a single virtual screen frame buffer, although examples that map into multiple buffers may be used.

Figure 3C:
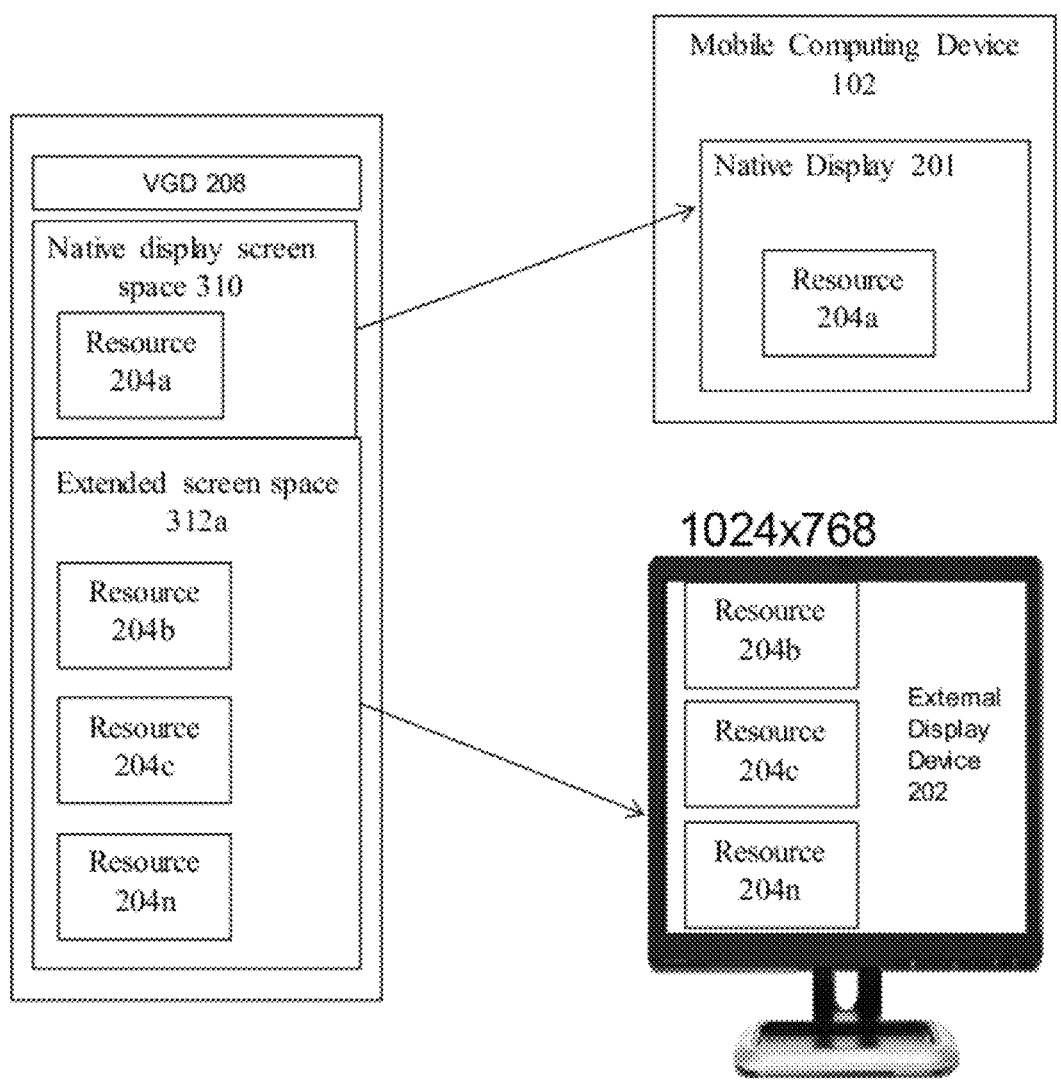
FIG. 3C is a block diagram illustrating an example logical representation of a plurality of screen spaces managed by a virtual graphics driver according to one or more aspects described herein.
Figure 4A:
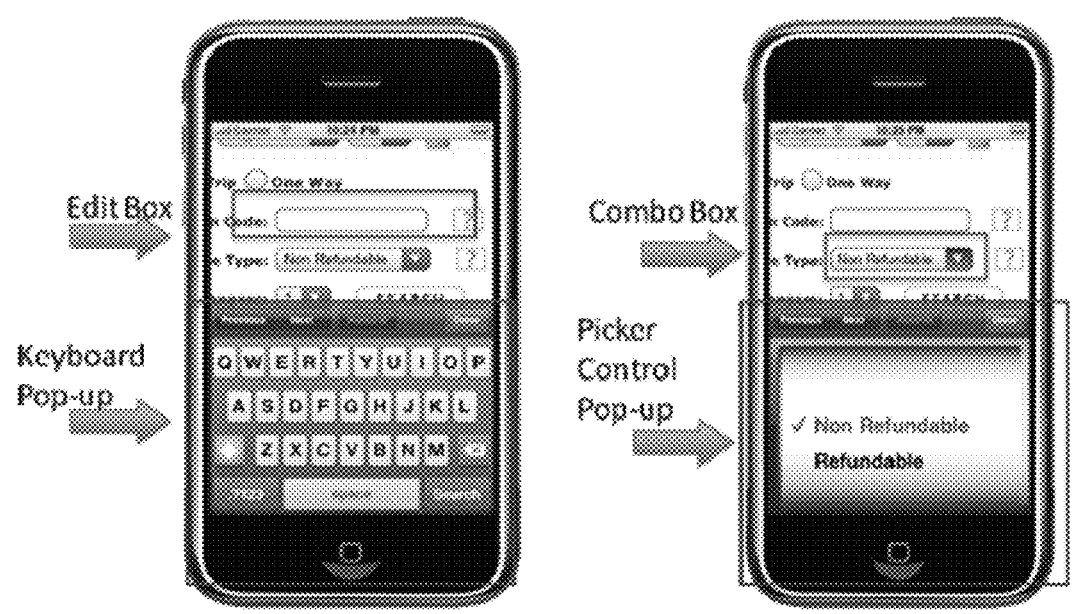
FIG. 4A is an example known interface displaying an application executing locally on a mobile device.
Figure 4B:
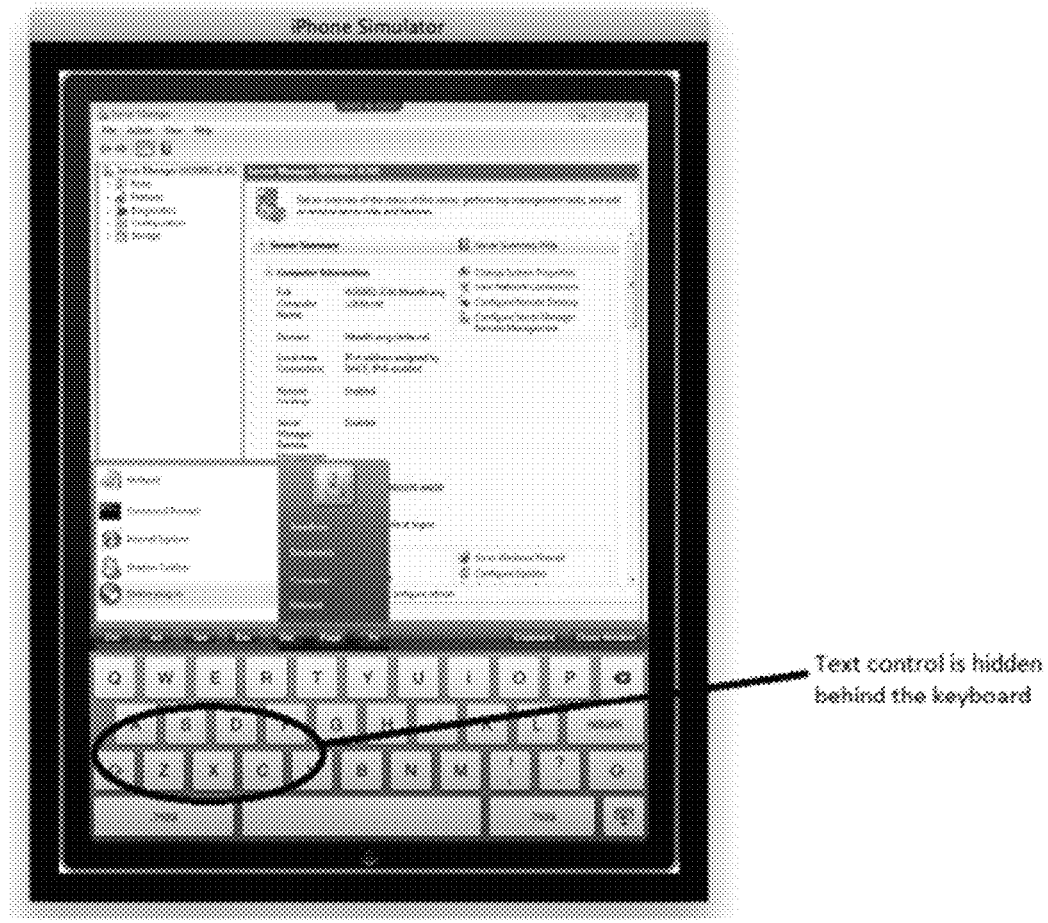
FIG. 4B is an example known interface displaying a remoted application on a mobile device.
Figure 4C:
FIG. 4C illustrates an example interface displaying a remoted application on a mobile device according to one or more aspects described herein.

Referring now to FIG. 3C, the block diagram illustrates an example logical representation of a plurality of virtual screen spaces managed by a virtual graphics driver. In this example, the virtual graphics driver 208 manages multiple virtual screen spaces with different resolutions in a virtual screen frame buffer. In this example, the native display 201 of the mobile computing device is the primary display and the external display device 202, corresponding to the extended screen 312*a*, is a secondary display. In various examples, output data associated with resources 204 on the native display screen space 310 will be displayed on the native display 201 and output data associated with resources 204 on the extended screen space 312*a* will be displayed on the external display device 202 associated with the extended screen spaces 312*a*. In other examples, all output data associated with resources 204 may be displayed on the native display 201. In still other arrangements, all output data associated with resources 204 may be displayed on an external display device such as external display device 202.

Providing a Native User Experience for Remoted Applications

Figure 5:
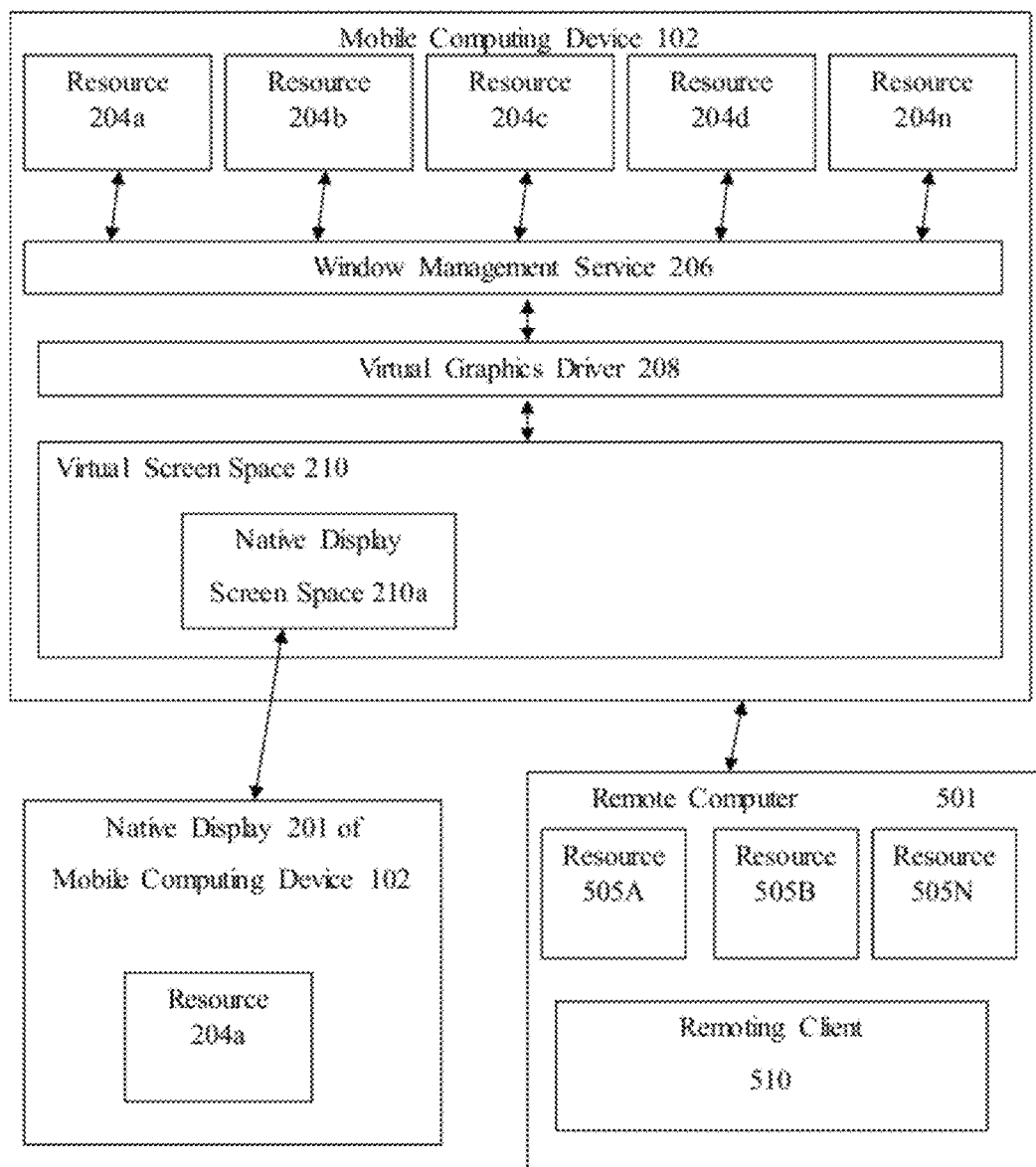
FIG. 5 is a block diagram illustrating an example system for altering the display of a remoted application on a mobile device according to one or more aspects described herein.

FIG. 5 illustrates an example system in which applications may be remotely executed at a server while providing display and user interaction through a client device such as mobile device 102. Accordingly, a user may view and interact with an application remoted from (e.g., remotely executed by the server (e.g., remote computer 501)) at a client device (e.g., mobile device 102) without requiring the application and/or data to be installed or stored on the client device. The system of FIG. 5 may include a mobile computing device 102 (e.g., similar to that shown in FIG. 2B) configured to execute and/or store one or more resources 204 such as applications executing on the mobile computing device 102. In some examples, at least one resource may be an operating system executing on the mobile device 102 and one or more other resources may execute within the context of the operating system. The mobile device 102 may further execute a windows management service 206 that may communicate with other applications executing on the mobile device 102 and, in some examples, may communicate with a virtual graphics driver 208 and the resources or applications 204 executing on the mobile device 102. The mobile computing device 102 may further execute a virtual graphics driver 208, and may store a buffer for generating a virtual screen space 210 that may include a buffer for a native display screen space 210a. The mobile device 102 may communicate with a native display 201 of the mobile device 102 on which application output generated by a resource 204 may be displayed. The mobile device 102 may further communicate with a remote computer 501 that may execute one or more resources 505A-505N (generally referred to as remote resources 505) which may in some examples be remote applications 505. The remote computer 501 may further execute a remoting client 510. The remote applications 505 may be executed by the remote computer for use at the mobile device 102 in one or more arrangements as discussed in further detail below. When one or more remote applications 505 are executed by the remote computer for use at the mobile device 102, those applications may be considered remoted applications.

According to one or more arrangements, resources 204 executing on the mobile device 102 and/or resources 505A-505N may be applications configured to accept data inputted by a touch screen. For example, the applications may be modified versions of applications that typically do not receive data from a touch screen. These modified applications 204 may receive data inputted by a user via a touch screen of the mobile device 102, and may be modified to accommodate typical touch screen input functions like a virtual keyboard and a virtual scroll menu. For example, a modified version of SAFARI, a web browser published by APPLE, may be modified to pan up when a user selects or gives focus to an edit control such as a text box. SAFARI pans the application upwards to accommodate the virtual keyboard displayed over the browser and so that a user may view the text box while typing on the virtual keyboard.

Touch input may include a variety of hand or finger movements and actions including touching a point on the screen, swiping movements, flicking movements, multi-finger or multi-touch actions (e.g., pinching, expansion) and gestures and the like. The touch input may trigger different functionalities depending on the type of application receiving the input. For example, some applications may receive a flicking action as closing the application while other application may interpret a flicking input as moving the application window in a certain direction. Each applications may define its own interpretation of different types of touch input or may use a standard definition provided by an underlying operating system.

According to one or more configurations, the mobile device 102 may communicate with remote computer 501 in a variety of ways. The remote computer 501 may be a server, a client or any other computing machine. In some examples the remote computer 501 may be a remote application server that executes one or more applications for mobile device 102. Accordingly, in some examples, the mobile device 102 may communicate with the remote computer 501 over one or more virtual channels. In some examples, virtual channels may be established over a network and may be referred to as a control virtual channel. In other examples, the virtual channel may be a seamless virtual channel. A control virtual channel may be used to remote control commands and other miscellaneous commands (e.g., for an application) while the seamless virtual channel may be used to remote application windows, a taskbar, a systray, etc. Thus, in some examples, each virtual channel may remote different functions and content. In still other examples, the virtual channel may be established by a window management service 206 executing on the mobile device 102, or the virtual channel may be established by both the window management service 206 and a remoting client 510 executing on remote computer 501. The virtual channel may in some examples facilitate communication sent using the ICA protocol.

In some examples, the remote computer 501 may execute a remoting client 510. The remoting client 510 may be a control virtual channel or a seamless virtual channel and may be a remoting application that corresponds to the virtual channel used by the client 510 to transmit data to and receive data from the mobile device 102. In some examples, the remoting client 510 may collaborate with the window management service 206 (of the mobile computing device 102) to modify remote applications 505 for remote display on the mobile device 102. The window management service 206 may be, for example, a CITRIX RECEIVER published by CITRIX SYSTEMS. In some examples, the remoting client 510 may communicate with the remote applications 505 to intercept event providing notifications and data generated by the remote applications 505. In particular, the remoting client 510 may perform event-based detection of one or more controls using application programming interfaces provided by one or more of the remote applications 505. For example, at least one remote application 505 may be an operating system executing on the remote computer 501. Another remote application 505B may be executing on the remote computer 501 and within the context of the operating system 505. In these examples, the remoting client 510 may intercept events generated by controls within the remote application 505B using application program interfaces made available by the operating system 505. The controls may be selected by the remoting client 510 based on whether the control has focus or is on a predetermined list of controls of interest. A control, in some examples, may be an object within an application that a user interacts with, e.g. a text box, drop down menu, radio button, button, check box, edit box, combo box etc. The control may further be referred to as a field or interactive element. In some examples, the remoting client 510 may intercept the control-generated events by registering with a communication interface associated with the application 505B to receive notifications when a focus-change event occurs within the application 505B. For example, the remoting client 510 may receive a notification when an object or control receives focus, e.g., indicating that a user selected a text box within the application.

In some examples, the remoting client 510 may communicate with the window management service 206 over the virtual channel. In a particular example, the remoting client 510 may send intercepted event notifications over the virtual channel to the window management service 206. In other examples, the remoting client 510 may transmit location coordinates for a control, the type of control, the contents of a control, the window handle of a control, and/or parent window information for a control. Window handles or other identification information for elements within an interface or application may include a globally unique identifier (GUID). The window management service 206 may receive information from the remoting client 510 and adjust or modify display of an application 204 on the native display 201 using the received information. Adjusting the display may include panning, zooming (in or out), scrolling or otherwise modifying the display of the application 204.

In some examples, the remote computer 501 may execute one or more resources 505. These resources, in some examples, may be applications. In other examples, at least one resource may be an operating system executing on the remote computer 501. In those examples, the other applications 505 may execute within the context of the operating system. In some instances, the applications 505 may correspond to remote applications 505 from the perspective of device 102 and one or more of applications 505 may be remoted to mobile device 102 for use by the user at mobile device 102.

Figure 6:
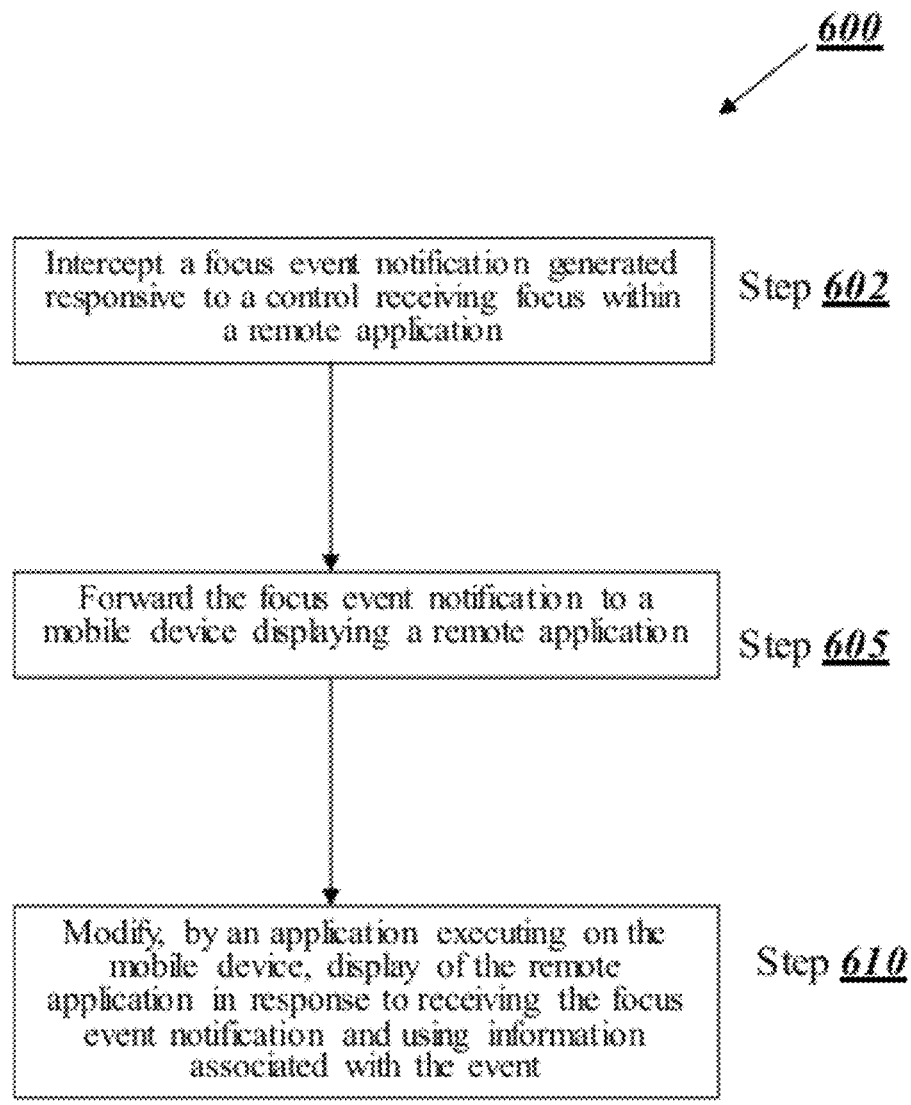
FIG. 6 is a flow diagram illustrating an example method for altering the display of a remoted application on a mobile device according to one or more aspects described herein.

FIG. 6 illustrates a general method 600 for altering or modifying the display of a remoted application on a mobile device. For example, in step 602, an application executing on a computer remote from the mobile device may intercept a focus event notification generated in response to a control within a remoted application receiving focus. The remote computer may forward the received or intercepted focus event notification to a client device through which a user is viewing and interacting with the remoted application (e.g., mobile computing device 102 of FIG. 5) in step 605. Upon receiving the focus event notification, an application executing on the mobile computing device may modify a display of the remoted application in response to receiving the notification and according to information associated with the event (Step 610).

Figure 7:
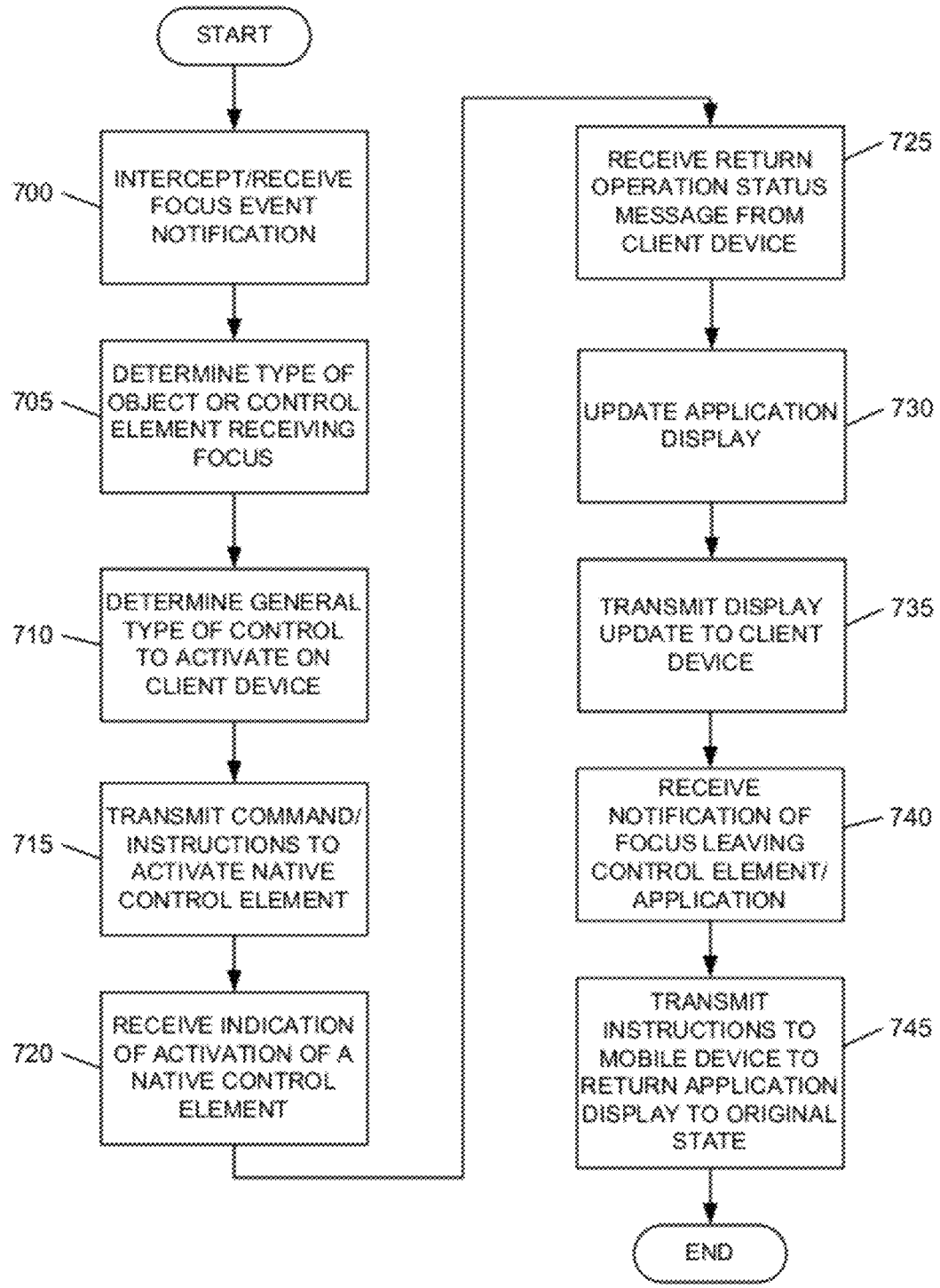
FIG. 7 is a flowchart illustrating a method for modifying a remoted application display to accommodate the activation of native control elements according to one or more aspects described herein.

FIG. 7 is a flowchart illustrating a method that may be performed by a computer executing an application for a remote client device (e.g., within the general process of method 600). In step 700, for example, a remoting management application executing on the computer may intercept or otherwise receive a focus event notification. The remoting management application may, in some examples, be a remoting client 510 executing on a remote computer 501. In other examples, the application may be any application executing on a remote computer 501 and able to hook into function calls issued by an application executing on the remote computer 501. The remoting management application executing on the remote computer 501, in a particular example, may be a component inside WFSHELL.EXE (ICACTLS.DLL) or another service of Citrix XenApp or XenDesktop server. In other examples, the remoting management application may be an application managing a control or seamless virtual channel established between the remote computer 501 and the mobile device 102. The focus event notification may be a call issued by a remote application executing on the remote computer 501 when a control or field within the remote application receives focus, e.g. a user selects or otherwise highlights the control or field through mobile device 102. In some examples, the control may be any object or control or user interactive or input element, such as: an edit box, a textbox, a memo field, a combo box, a drop-down menu, a slider, a list box, or any other similar object or control. The function may, for example, be a function such as 'focus combo box" or any other function that generates a notification indicating a control receiving focus. In some examples, the remoting management application may use event-based detection facilitated by WINDOWS 7 UI AUTOMATION application program interfaces. In other examples, the remoting management application may use event-based detection facilitated by any API. In these examples, the application may register for notifications provided by these APIs using a COM interface associated with a particular control and/or a particular function.

The remoting management application may send additional information to the mobile device 102, e.g., separately or as part of the notification message, including: the type of control or interface element that received focus (e.g. combo box, textbox); the name or an identifier of the control that received focus; the location or coordinates of the control within the application (e.g. where in the application output the control is located); the content of the control (e.g. values assigned to the control, strings associated with the control, etc.); a window handle of the control; a window identifier of the window displaying the control; the location or coordinates of the parent window displaying the control; or any additional information that could be used to determine the location of the control within the application output displayed by the mobile device 102.

In step 705, the remote computer 501 may determine the type of object or control element receiving focus and/or a position thereof. For example, the computer may determine whether the control element is a text entry field, a menu of selectable values, a radio button or the like. The computer may also determine position information based on position data specified in the notification message, including the coordinates and size of the control element on which focus is placed. In step 710, the remote computer 501 may then determine a general type of user control element to activate on the mobile device based on the determined type of control element of the remoted application receiving focus. For example, if the control element of the remoted application corresponds to a text entry field, the computer may determine that a software keyboard of type standard alphanumeric would be appropriate for interacting with the text entry field in a touch-input environment. In another example, if the control element of the remoted application corresponds to a number entry field (e.g., only numbers are permitted in the field), the computer may determine that a software keyboard of a number pad type may be most appropriate for interacting with the number entry field.

In step 715, the computer may transmit a command to the mobile device to activate a native control element corresponding to the determined type of control element locally on the mobile device. The command may be transmitted through a virtual channel between the remoting application and a remoting client application executing on the mobile device. Additionally, in one or more examples, if the type of control element to be shown or activated on the client device is a software keyboard, the computer may transmit the command identifying the type of the control element and identification of an editable area or field for which the control element is to be activated. The identification of the editable area or field may include coordinates, size information and the like. In another example, if the type of control element to be shown or activated locally on the client device is a picker control (e.g., a menu or scroll selection bar), the computer may transmit the command along with an identifier of the picker control, an area or field definition (e.g., coordinates, size information), contents of the picker control (e.g., the selectable items), current selection index, a title of the picker control and/or window and parent window handles.

In some arrangements, the remote computer 501 might not determine a mobile device-native control element or type thereof to activate or use. Instead, the user of the mobile device may manually select or activate a native control element at the mobile device.

In step 720 the remote computer may receive an indication (e.g., a notification or confirmation) from the mobile device of the activation of a user control or input element native to the mobile device. The indication may include, for example, a confirmation of the state of the control element (e.g., show/hide), success or failure from execution of the command and/or an identifier of the local control element, e.g., mirroring the control identifier from the original command from the remote computer.

In some arrangements, the remote computer 501 may receive a return operation status message from the client device (e.g., mobile device 102) in step 725, indicating an operation status of an activated local control element such as a picker control. For example, the return operation status message may include the identifier of the control, the operation status of the control and a selection index if the operation status indicates a selection made by the user. The selection index may identify the selected item. The operation status may include success (indicating that a selection has been made by the user) or cancel/abort (e.g., if the user has deactivated the control element without selection).

Additionally or alternatively, in step 730, the remote computer 501 may further update the application display to reflect a selection made by a user (e.g., in a picker control element) in response to a notification from the client of the operation status and the selection. For example, the selection field may be updated with the selected value and the updated application display may be transmitted to the client device (e.g., mobile device 102) for display. The application display update may then be transmitted to the client device in step 735.

In step 740, the remote computer 501 may receive another notification indicating that focus has left the control element and/or the remoted application. In response, the remote computer 501 may issue an instruction to the mobile device 102 (or a client application executing thereon) to return the application display to an original state and/or to deactivate the native control element in step 745 (e.g., if the application display was previously modified upon the remoted application receiving focus). In some arrangements, the remote computer 501 may issue the instruction only upon receiving notification that the native control element is no longer active (e.g., being displayed) or in use.

Figure 8:
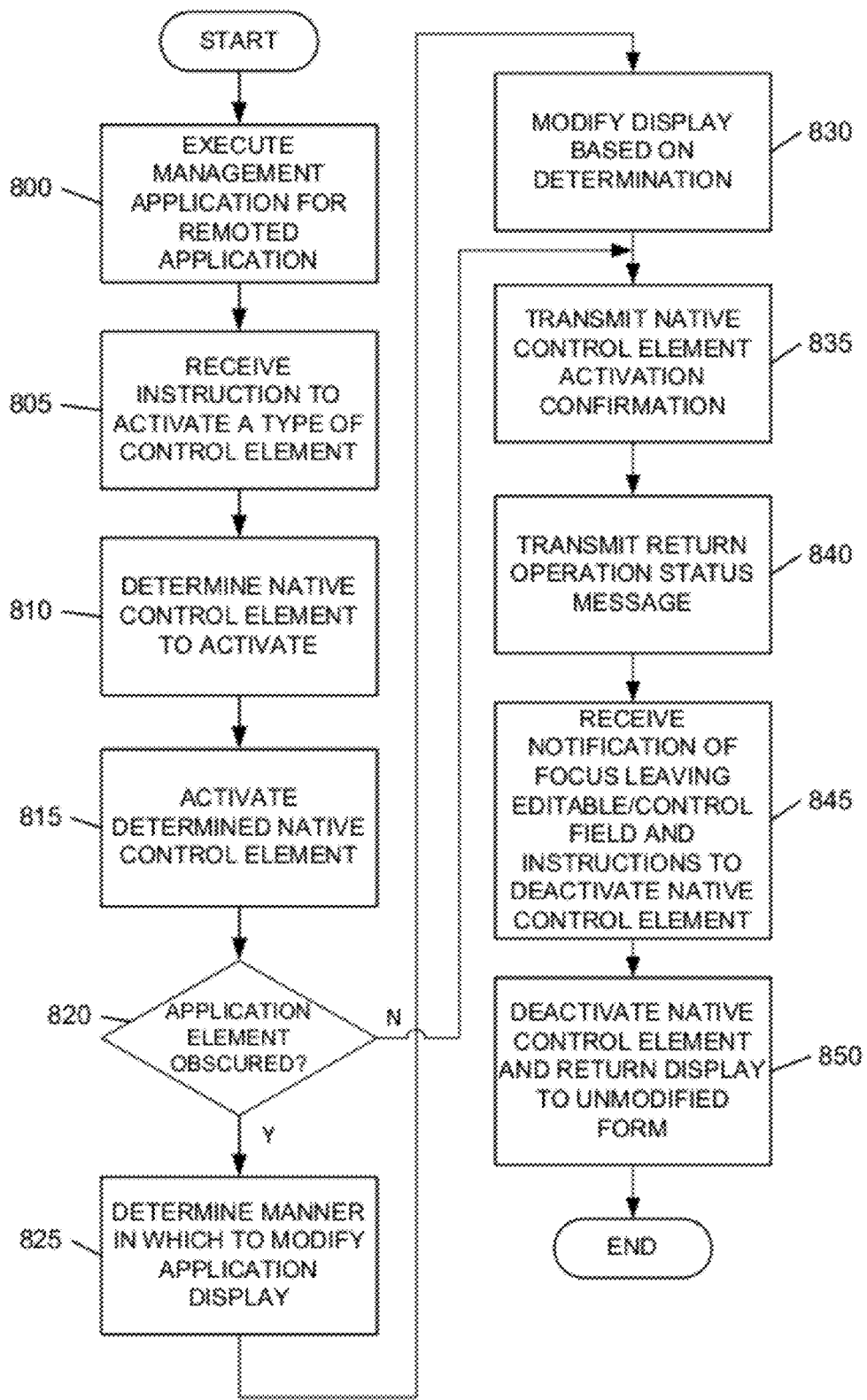
FIG. 8 is a flowchart illustrating a method for managing a display on a device based on the activation of native control elements according to one or more aspects described herein.

FIG. 8 is a flowchart illustrating a process by which a device such as mobile device 102 (FIG. 5) may receive output data and instructions from a remote computing device executing a remoted application. In step 800, the device (e.g., a client device) may execute a management application to provide interactivity with and receive data output from an application remotely executing on a server or other remote computing device. For example, the management application executing on the mobile device 102 may modify the display of the remoted application on the mobile device 102 in response to receiving instructions from the remote computing device (e.g., as described with respect to FIG. 7). In some examples, the management application may be a window management service 206 executing on the mobile device 102. In other examples, the management application may be any application able to receive event and control information from a remote computer 501 and use it to modify output displayed on the native display 201 of mobile device 102. In step 805, the device may receive, from the remote computer executing the application, an instruction to activate a type of control element. In one or more examples, the instruction may be received from the remote computer in response to the remote computer detecting an editable or control field receiving focus (e.g., a user selecting, through the client device, a text entry field in a remoted application display).

In response to the instruction, the device may determine a native control (e.g., user input) element to activate based on the type of control element specified in the instruction in step 810. For example, if the general type of control element corresponds to a standard alphanumeric keyboard, the device may identify a native control element matching the specified type such as an iOS standard alphanumeric keyboard (if it is an iOS mobile device), or an Android standard alphanumeric keyboard (if it is an Android mobile device). In some arrangements, the general types of controls supported by or available on the client device may be reported to the remote computer executing the application so that the remote computer may select an appropriate general type. Alternatively or additionally, the remote computer may process the focus event differently if a corresponding general type of control element is not supported by the client device, as is described in further detail herein. In some examples, the instructions may specify activation of multiple types of controls. Operation of the multiple native controls may be based on the use and specification of the GUID assigned to each native control.

Upon determining an appropriate control element corresponding to the specified type of control element, the device may activate or execute the determined native control in step 815. In one example, activation and/or execution of the native control may include modifying the native display interface to display the control. Activation and/or execution of the native control might also include extracting control element values (e.g., values within a drop-down menu) and incorporating those values into the native control element (e.g., the virtual picker in the above example). For example, in some arrangements, the remote computer executing the remoted application may transmit control values included in the application control element receiving focus to the device for display in the native control element. Accordingly, upon receiving the event notification and control information, the window management service 206 at the mobile or client device may determine whether the control is a type of control having associated values. Upon determining that the control has associated values, the window management service 206 may modify the display of the application to include the received values. In one example, if one or more strings are associated with a combo box having received focus, the window management service 206 may modify the display to display a combo box that includes those strings. In other aspects, a client executing on the device, or a window management service 206, may use local controls native to the device to display a remote control or to display graphics representative of a remote control. For example, when a remote Windows Combo Box is presented in an application, the device may display and/or use a local iPad picker control. Thus, the remote application displayed on the device may adopt the appearance of a device native application and may include at least some native functionality.

The device may further determine, in step 820, whether the native control element will (or does) obscure the element of the remoted application receiving focus. For example, the device may determine an amount of the remoted application element being obscured (e.g., a percentage, absolute amount in pixels, inches or other metric), a particular area being obscured (e.g., obscuring a left part of a text entry field may be less important than obscuring a right part of the text entry field for language environments that read left to right), and the like. In some arrangements, the remoted application element might not be considered obscured if the amount obscured or portion obscured does not meet a predefined rule or threshold. For example, a remoted application element might only be considered obscured if at least 25%, at least 10%, at least 50%, etc. of the element is not visible. In another example, a remoted application might only be considered obscured if any portion of the left side of a text entry field (e.g., any part of the left 50% of the text entry field) is hidden from view. Other rules for determining when a control element is obscured may be defined and used.

If the device determines that the application control element will be or is obscured by the native control element, the device may determine, in step 825, a manner in which to modify the local display such that at least the application control element is no longer obscured. For example, if a mobile device native keyboard is to be displayed at the bottom of the mobile device display and will obscure the application control element, the device may determine that the one or more portions of the local display (desktop interface or application specific window(s) or portions thereof) should be panned upward (e.g., auto-scroll). Additionally or alternatively, the device may modify the display (entire desktop, portions of the desktop and/or specific windows) to include a scrolling feature so that a remainder of the application display may be viewed once the display is panned upward if there is insufficient display real estate. In another example, the device may modify the application window to zoom out (e.g., shrink the application display) so that the application display fully fits within the mobile device display.

In step 830, the device may subsequently modify the display in accordance with the determined manner to avoid obscuring the editable/control field. Alternatively, if the editable/control field receiving focus will not be obscured, the device might not modify the display. In some examples, steps 820-830 may be performed in conjunction with (e.g., before, during or after) activation of the native control element in step 815.

In some examples, the device may transmit a confirmation message to the remote computing device confirming activation of the native control element as shown in step 835. Alternatively or additionally, the device may further transmit a return operation status message to the remote computing device in step 840, as described above with respect to steps 725 and 730 of FIG. 7. For example, status messages may be provided when the device detects a user selection of an item in the picker control. In another example, the device may transmit a status message upon detecting a user cancelling or aborting the picker control. These events may be reported to the remote computing device in the update message for appropriate handling by the remote computing device. If the update message includes an event that causes changes to the application display, for instance, those changes to the application display may be received from the remote computing device for updating the local application display.

The client device may further receive, in step 845, a message indicating that focus has left the editable/control field and providing instructions to deactivate the corresponding native control element. In response, the client device may deactivate the native control element and return the application display to a previous state (e.g., prior to activation of the native control element) in step 850 if modification was performed.

The processes of FIGS. 7 and 8 may further include transmitting actions performed on or through a native control element of the client device back to the remote computing device and remote application. For example, Application A executing on the remote computing device may generate application output which may be displayed in an application output window on the remote computing device. The application output generated by Application A is subsequently transmitted to the client device where it is displayed within an application output window thereon (e.g., a local application window). In some examples, when an editable combo box field within the remotely generated application output receives focus, a client or a window management service 206 may intercept the on-focus event and may display or invoke a native, virtual picker control, e.g., an iPad picker control. Within the local application window and amongst the remotely generated application output, the native, virtual picker control is displayed. A user may interact with the native control to generate input. Once the control is used to generate input, the client or window management service 206 may transmit the input to the remote computing device for processing within the context of the remoted application. For example, upon receiving the input, the remote computer 501 may inject the control input into an actual control displayed within the actual application output generated by Application A. In a particular example, injection of the received control input may be accomplished using a Windows UI Automation API. Changes in the remoted application based on the received input may then be outputted back to the client device. This process may repeat until the remoted application is closed and/or the remoting relationship between the client device and the remote computing device is ended.

Additionally or alternatively, the remote computing device (executing the remoted application) may further be configured to determine whether the client device supports or has local control elements such as a native virtual keyboard or a native picker corresponding to a particular type or category of control element. For example, the client device's capabilities may be specified to the remote computing device and as such, the remote computing device may make the above noted determination. If the client device does not support or does not have a local control element corresponding to a determined type of control element corresponding to the editable/control field, the remote computing device may generate a virtual keyboard or other control element as part of the remoted application or separately from the remoted application and output the display of the virtual keyboard to the client device (similar to the remoting of the application). In one particular example, the virtual control element generated by the remote computing device may be executed and remoted as a separate application. In another example, the virtual control element may be included within and as part of the existing remoted application receiving focus.

According to another aspect, the activation of a native control element may be switched on or off by the user or by a service providing the application remoting capability. Accordingly, if the user or the service does not wish to use native controls, the device might not automatically trigger a native control element upon receiving a focus event notification for an editable field. Additionally or alternatively, the remote computing device executing the application may be configured to determine whether an editable/control field will be obscured and to determine and provide instructions for modifying a local display of the client device in response.

Accordingly, the remote computing device may transmit instructions for modifying the local display and/or the application display of the client device.

Figure 9B:
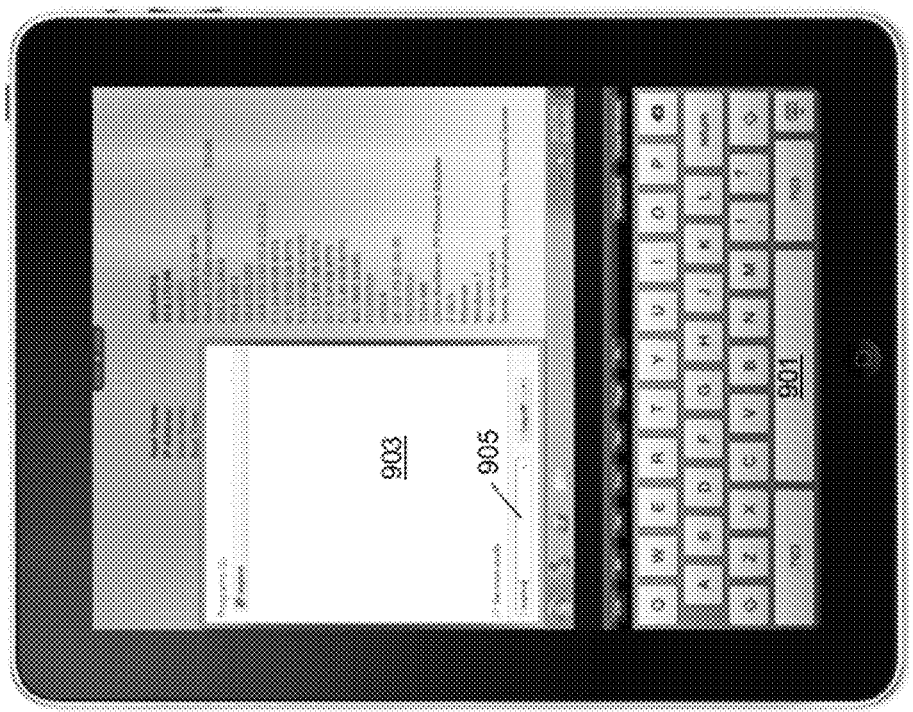
FIG. 9A and FIG. 9B illustrate an example sequence of user interfaces in which a native input element is activated and a display of an application is modified according to one or more aspects described herein.
Figure 9A:
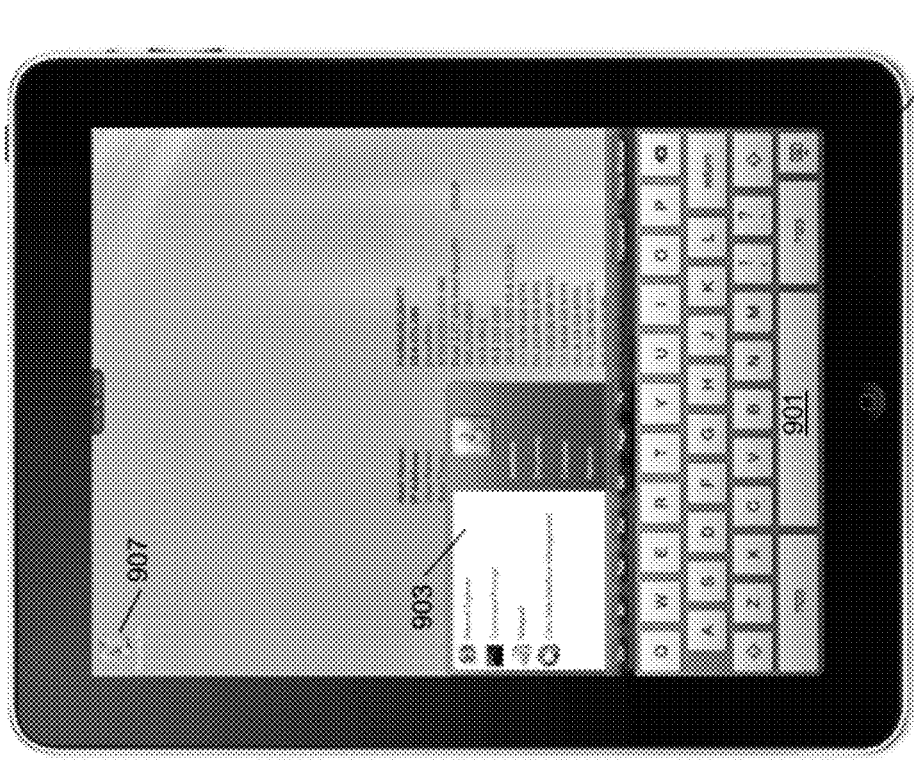

FIGS. 9A and 9B illustrate example interfaces displaying the use of native controls including a virtual keyboard. In FIG. 9A, for example, a native control of the device 900 such as virtual keyboard 901 is activated and displayed for entry of input into a text entry field without modifying a remote application display 903. As a result, the text entry field and other potentially important or relevant portions of the application display 903 become obscured by the virtual keyboard 901.

In FIG. 9B, to avoid obscuring the text entry field 905, the application display may be panned upward. In some arrangements including the arrangement of FIG. 9B, the display of an entire desktop including the remote application display 903 may be modified. Panning may include moving the application display 903 in a particular direction (in this example, towards the top of the display) with or without modifying the proportions or orientation of the application display 903 or desktop. In some examples, panning may result in elements that were previously visible being moved off of the device display. For example, recycle bin icon 907 in FIG. 9A is moved off of the displayable area after the application display 903 is panned upward as shown in FIG. 9B. The amount or degree to which the application display 903 is modified (e.g., panned) may be determined based on various rules and thresholds. In a particular example, the application display 903 may be panned until at least 75% of the text entry field is visible. In another example, the application display 903 may be panned until an entirety of the text entry field is visible.

Figure 10B:
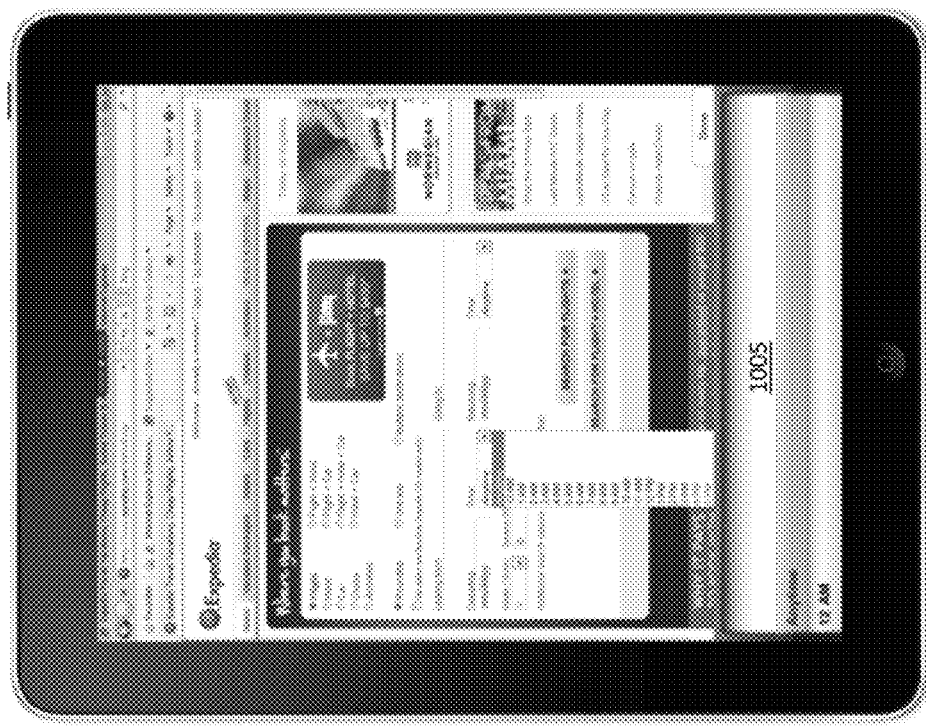
FIG. 10A and FIG. 10B illustrate another example sequence of user interfaces in which a native input element is activated and a display of an application is modified according to one or more aspects described herein.
Figure 10A:
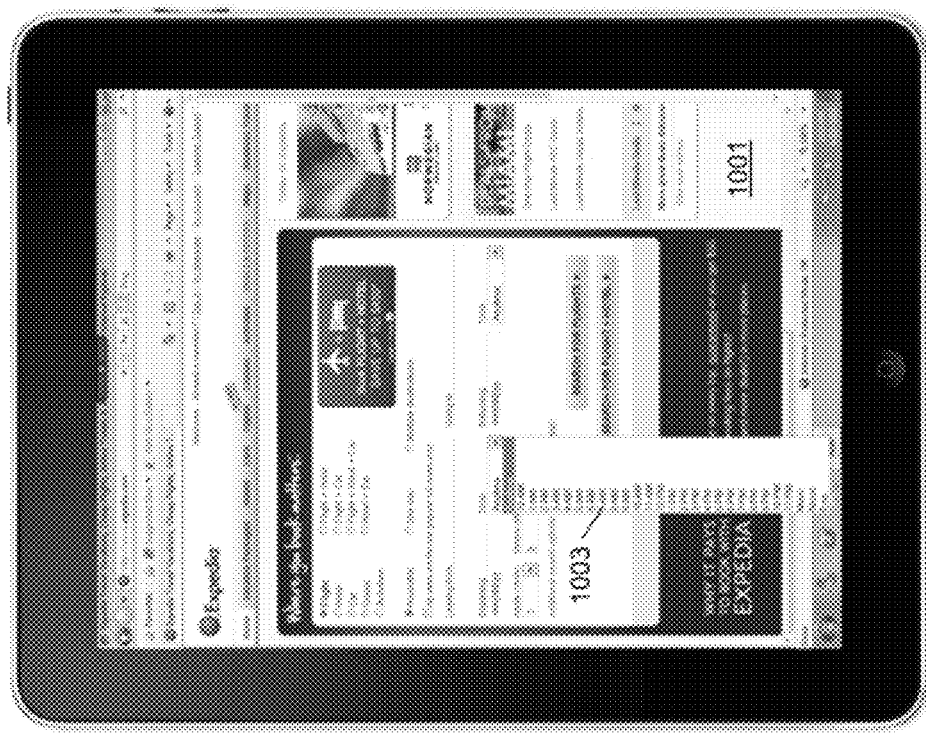

FIGS. 10A and 10B illustrate other example interfaces displaying the use of native controls including a scrolling picker. In FIG. 10A, a web browser application 1001 is displayed with content having various control elements including a drop down menu 1003. The drop down menu 1003 may include multiple selectable values that, in some arrangements, may be difficult to see because of font size, the number of values, size of the drop down portion of the menu and the like.

Accordingly, in FIG. 10B, the interface may display a native picker control element 1005. The native picker element 1005 may be populated with the values included in drop down menu 1003. The native picker control element 1005 may be displayed for easier viewing and accessibility (e.g., larger font size, easier selection mechanism, etc.). In the illustrated example of FIG. 10B, the application display might not be modified. Because the values listed in the drop down menu 1003 are also displayed in native picker control element 1005, obscuring part or all of the drop down menu 1003 might not have as significant an impact in usability. In some examples, the application display may be modified to insure that the non-expanded drop down menu portion remains visible so that a user may confirm his or her selection once populated into the drop down menu 1003. In yet other examples, the application display may zoom in to the drop down menu 1003 or a portion thereof to increase viewability.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Moreover, while many of the aspects and features described herein include the use of a mobile device, stationary or fixed location devices may also include the same or similar aspects and features. For example, a personal computer or workstation (e.g., plugged into a wall socket) may include touch input controls and provide access to a remoted application from a remote computing device. Accordingly, similar native control elements may be generated and used from the personal computer or workstation in similar fashion to a mobile device such as a tablet computer.

Additionally or alternatively, in at least some examples, the methods and features recited herein may be implemented through one or more integrated circuits (ICs). An integrated circuit may, for example, be a microprocessor that accesses programming instructions or other data stored in a read only memory (ROM). In some such examples, the ROM stores programming instructions that cause the IC to perform operations according to one or more of the methods described herein. In at least some other examples, one or more of the methods described herein are hardwired into an IC. In other words, the IC is in such cases an application specific integrated circuit (ASIC) having gates and other logic dedicated to the calculations and other operations described herein. In still other examples, the IC may perform some operations based on execution of programming instructions read from ROM or RAM, with other operations hardwired into gates and other logic of IC. Further, the IC may output image data to a display buffer.

Although specific examples of carrying out various features have been described, those skilled in the art will appreciate that there are numerous variations and permutations of the above-described systems and methods that are contained within the spirit and scope of the disclosure as set forth in the appended claims. Additionally, numerous other examples, modifications and variations within the scope and spirit of the appended claims will occur to persons of ordinary skill in the art from a review of this disclosure.

We claim:

1. A method comprising:
  generating, by a client device, an application display for an application executing at a remote computing device;
  receiving, by the client device, an instruction from the remote computing device requesting activation of a native graphical user input element native to the client device;
  receiving, by the client device, from the remote computing device, one or more control values for an application control element on the remote computing device; and
  in response to receiving the instruction from the remote computing device:
    determining at least one characteristic of the native graphical user input element;
    activating, by the client device, separately from the application display for the application executing at the remote computing device, the native graphical user input element native to the client device;
    populating, by the client device, the native graphical user input element with the one or more control values received from the remote computing device;
    generating, by the client device, a display simultaneously comprising a display of the native graphical user input element native to the client device, the application display for the application executing at the remote computing device, and the application control element on the remote computing device, the display of the native graphical user input element being different from the application display; and
    modifying the application display for the application executing at the remote computing device based on the at least one characteristic of the native graphical user input element native to the client device.

2. The method of claim 1, wherein the instruction from the remote computing device specifies a type of control element to be activated on the client device and wherein the method further comprises determining the native graphical user input element native to the client device to activate based on the type of control element.

3. The method of claim 1, further comprising:
determining whether the display of the native graphical user input element will overlap one or more portions of the application display when the native graphical user input element is activated.

4. The method of claim 3, wherein determining whether the display of the native graphical user input element will overlap the one or more portions of the application display is performed based on at least one of: a size and a position of the native graphical user input element.

5. The method of claim 1, further comprising:
detecting user interaction with the native graphical user input element, wherein the detected user interaction is made separately from the application; and
transmitting a notification message to the remote computing device, the notification message reporting the user interaction.

6. The method of claim 5, wherein the native graphical user input element comprises a menu with one or more user-selectable items corresponding to the one or more control values received from the remote computing device, wherein the user interaction comprises a selection of one of the one or more user-selectable items and wherein the notification message comprises an identification of the selected one of the one or more user-selectable items.

7. The method of claim 1, further comprising:
receiving an instruction to deactivate the native graphical user input element;
deactivating the native graphical user input element; and
returning the application display to a state of the application display existing before the modifying.

8. The method of claim 1, wherein the modifying the application display based on the at least one characteristic of the native graphical user input element comprises scrolling the application display.

9. The method of claim 1, wherein the modifying the application display based on the at least one characteristic of the native graphical user input element comprises panning the application display in a specified direction.

10. The method of claim 1, wherein the modifying the application display based on the at least one characteristic of the native graphical user input element comprises zooming the application display in or zooming the application display out.

11. A method comprising:
receiving, by a first computing device, a first notification indicating an application control element of a display of a remoted application receiving focus, wherein a display of the remoted application is transmitted to a second computing device remote from the first computing device;
determining a type of the application control element of the remoted application receiving focus; and
transmitting an instruction to the second computing device, the instruction comprising a request for the second computing device to activate, separately from the remoted application, a graphical user input element native to the second computing device and corresponding to the type of the application control element, wherein the graphical user input element native to the second computing device is different from the display of the remoted application; and transmitting, to the second computing device, one or more control values for the application control element for populating the graphical user input element native to the second computing device,
wherein the instruction to the second computing device further comprises a request for the second computing device to generate a display simultaneously comprising the graphical user input element native to the second computing device, the display of the remoted application, and the application control element of the remoted application receiving focus.

12. The method of claim 11, further comprising:
receiving a second notification of focus leaving the application control element; and
in response to receiving the second notification, transmitting a different instruction to the second computing device to further modify the display of the remoted application.

13. The method of claim 12, wherein the remoted application is displayed in a first state before receiving the first notification and is returned to the first state after receiving the second notification.

14. The method of claim 12, wherein the different instruction comprises a request to deactivate the graphical user input element native to the second computing device.

15. The method of claim 11, wherein transmitting the instruction to the second computing device comprises transmitting at least one of: a size and a position of the application control element of the remoted application receiving focus.

16. The method of claim 11, further comprising:
receiving a second notification message comprising information regarding a user interaction with the graphical user input element native to the second computing device.

17. The method of claim 16, wherein the user interaction with the graphical user input element native to the second computing device comprises receiving user input via the graphical user input element native to the second computing device.

18. The method of claim 16, wherein the user interaction with the graphical user input element native to the second computing device comprises receiving a command to close the graphical user input element native to the second computing device.

19. One or more non-transitory computer-readable media storing computer-readable instructions that, when executed, cause a system to:
receive a first notification indicating at least an application control element of a remoted application receiving focus, wherein a display of the remoted application is transmitted to a computing device remote from the system;
determine a type of the application control element of the remoted application receiving focus; and
transmit an instruction to the computing device, the instruction comprising a request for the computing device to activate, separately from the remoted application, a graphical user input element native to the computing device and corresponding to the type of the application control element, wherein the graphical user input element native to the computing device is different from the display of the remoted application; and transmit, to the computing device, one or more control values for the application control element for populating the graphical user input element native to the computing device, wherein the instruction to the computing device further comprises a request for the computing device to generate a display simultaneously comprising the graphical user input element native to the computing device, the display of the remoted application, and the application control element of the remoted application receiving focus.

20. The one or more non-transitory computer-readable media of claim 19, wherein the computer-readable instructions, when executed, further cause the system to:

receive a second notification of focus leaving the application control element; and in response to receiving the second notification, transmit another instruction to the computing device to further modify the display of the remoted application.

21. The one or more non-transitory computer-readable media of claim 19, wherein the remoted application is displayed in a first state before receiving the first notification and is returned to the first state after receiving a second notification of focus leaving the application control element.

22. The one or more non-transitory computer-readable media of claim 19, wherein the graphical user element native to the computing device does not obscure the display of the remoted application.

23. One or more non-transitory computer-readable media storing computer-readable instructions that, when executed by a processor, cause a system to:

generate a display for an application executing at a remote computing device, the display comprising an application control element of the application;

receive an instruction from the remote computing device requesting activation of a graphical user input element native to the system, the graphical user input element corresponding to the application control element of the application;

receive one or more control values for the application control element of the application;

determine at least one characteristic of the graphical user input element native to the system;

activate, separately from the application, the graphical user input element native to the system;

populate the graphical user input element native to the system with the one or more control values received from the remote computing device;

generate a display simultaneously comprising the graphical user input element native to the system and the application control element of the application; and modify the display for the application based on the at least one characteristic of the graphical user input element native to the system.

24. The method of claim 3, wherein modifying the application display comprises adjusting the application display so that at least a portion of the application display is not overlapped by the display of the native graphical user input element.

25. The method of claim 24, wherein the portion of the application display that is not overlapped by the display of the native graphical user input element comprises the application control element.

26. The method of claim 1, wherein the application control element on the remote computing device is a menu, and the one or more control values comprise values of the menu.

27. The method of claim 26, wherein the native graphical user input element native to the client device comprises a virtual picker, and the virtual picker comprises the one or more control values of the menu of the remote computing device received from the remote computing device.

28. The method of claim 27, wherein generating, by the client device, the display simultaneously comprising the display of the native graphical user input element native to the client device, the application display, and the application control element on the remote computing device comprises generating, by the client device, a display simultaneously comprising the menu of the remote computing device and the virtual picker of the client device.

29. The one or more non-transitory computer-readable media of claim 23, wherein the computer-readable instructions, when executed by the processor, cause the system to:

determine whether the application control element of the application is obscured by the graphical user input element native to the system; and modify the display for the application such that at least the application control element of the application is not obscured by the graphical user input element.

30. The one or more non-transitory computer-readable media of claim 23, wherein the computer-readable instructions, when executed by the processor, cause the system to:

transmit, to the remote computing device, a confirmation of the graphical user input element native to the system.

* * * * *